(12) United States Patent
Prate et al.

(10) Patent No.: US 12,404,934 B2
(45) Date of Patent: Sep. 2, 2025

(54) FIRE-RESISTANT SEAL ASSEMBLIES

(71) Applicant: Greene, Tweed Technologies, Inc., Wilmington, DE (US)

(72) Inventors: Devin Prate, Philadelphia, PA (US); Steve Okladek, Bethlehem, PA (US); Laurence S. London, Lansdale, PA (US)

(73) Assignee: Greene, Tweed Technologies, Inc., Wilmington, DE (US)

( * ) Notice: Subject to any disclaimer, the term of this patent is extended or adjusted under 35 U.S.C. 154(b) by 0 days.

(21) Appl. No.: 18/461,472

(22) Filed: Sep. 5, 2023

(65) Prior Publication Data

US 2024/0209945 A1    Jun. 27, 2024

Related U.S. Application Data

(63) Continuation of application No. 17/013,652, filed on Sep. 7, 2020, now abandoned, which is a continuation
(Continued)

(51) Int. Cl.
*F16J 15/3284* (2016.01)

(52) U.S. Cl.
CPC ................ *F16J 15/3284* (2013.01)

(58) Field of Classification Search
CPC ........ F16J 15/3284; F16J 15/06; F16J 15/064; F16J 15/065; F16J 15/18; F16J 15/20
See application file for complete search history.

(56) References Cited

U.S. PATENT DOCUMENTS

| 2,976,066 A | 3/1961 | Antoniades et al. |
| 3,124,502 A * | 3/1964 | Radke ............. F16J 15/20 |
| | | 428/378 |

(Continued)

FOREIGN PATENT DOCUMENTS

| CN | 205350358 U | 6/2016 |
| EP | 0 060 238 A1 | 9/1982 |

(Continued)

OTHER PUBLICATIONS

International Search Report and Written Opinion from Counterpart PCT/US2019/021710 (17 pages).

(Continued)

*Primary Examiner* — Gilbert Y Lee
(74) *Attorney, Agent, or Firm* — Calderone McKay LLC

(57) ABSTRACT

The present invention provides fire-resistant seal assemblies that are particularly suited for use in hydraulic components in fire zones. The fire-resistant seal assemblies include a first seal made from an elastomeric material; a first anti-extrusion seal having a first seal-facing surface for receiving the first seal and defining a groove extending therealong, and an exterior surface having a truncated V-shaped portion with beveled end portions in a longitudinal cross sectional view; at least one second anti-extrusion seal having a second seal-facing surface for receiving the first anti-extrusion seal and defining a groove extending therealong, and an exterior surface having a truncated V-shaped portion with beveled end portions in a longitudinal cross sectional view; and at least one backer ring having a third seal-facing surface for receiving the second anti-extrusion seal and defining a groove extending therealong, and an exterior surface having a truncated V-shaped configuration in a longitudinal cross sectional view.

27 Claims, 39 Drawing Sheets

Related U.S. Application Data of application No. PCT/US2019/021710, filed on Mar. 11, 2019.

(60) Provisional application No. 62/640,961, filed on Mar. 9, 2018.

(56) References Cited

U.S. PATENT DOCUMENTS

| | | | |
|---|---|---|---|
| 3,869,132 A | | 3/1975 | Taylor et al. |
| 3,907,307 A | | 9/1975 | Maurer et al. |
| 3,934,889 A | | 1/1976 | Smith |
| 4,234,197 A | | 11/1980 | Amancharla et al. |
| 4,468,043 A | | 8/1984 | Brazel |
| 4,576,485 A | | 3/1986 | Ungchusri et al. |
| 4,630,636 A | * | 12/1986 | Cutcher ............... F16K 41/04 137/315.35 |
| 4,811,959 A | * | 3/1989 | Bullard ............... E21B 33/1208 277/342 |
| 4,895,378 A | | 1/1990 | Newquist et al. |
| 5,131,666 A | | 7/1992 | Hutchens |
| 5,251,917 A | | 10/1993 | Chee et al. |
| 5,306,021 A | | 4/1994 | Morvant |
| 5,309,993 A | | 5/1994 | Coon et al. |
| 5,524,905 A | | 6/1996 | Thoman et al. |
| 5,549,276 A | | 8/1996 | Pittman et al. |
| 6,318,729 B1 | | 11/2001 | Pitts, Jr. et al. |
| 6,406,028 B1 | | 6/2002 | Kannan |
| 7,341,258 B2 | | 3/2008 | Holt et al. |
| 7,401,788 B2 | | 7/2008 | Williams et al. |
| 8,474,829 B2 | | 7/2013 | Otsuka et al. |
| 8,794,638 B2 | | 8/2014 | Tuckness et al. |
| 8,814,139 B2 | | 8/2014 | Griffin et al. |
| 2003/0222410 A1 | * | 12/2003 | Williams ............... F16J 15/181 277/619 |
| 2010/0219592 A1 | * | 9/2010 | Tuckness ............... E21B 33/10 277/638 |
| 2012/0025119 A1 | | 2/2012 | Griffin et al. |
| 2013/0087977 A1 | | 4/2013 | Galle et al. |
| 2014/0075948 A1 | | 3/2014 | Exner |
| 2014/0124193 A1 | * | 5/2014 | Rowe ............... E21B 33/1212 166/115 |
| 2015/0360795 A1 | | 12/2015 | Livingston |
| 2017/0096940 A1 | | 4/2017 | Brice |

FOREIGN PATENT DOCUMENTS

| | | | |
|---|---|---|---|
| EP | 2 957 794 A1 | 6/2015 | |
| GB | 2 415 471 A | 12/2005 | |
| JP | 05-100062 B2 | 12/2012 | |
| WO | WO-0046483 A1 * | 8/2000 | ............. E21B 33/10 |

OTHER PUBLICATIONS

Canadian Office Action in Counterpart CA 3,093,406, Oct. 26, 2023 (4 pages).
Canadian Response to Office Action in Counterpart CA 3,093,406 with Claims, Feb. 26, 2024 (30 pages).
European Partial Search Report in European Counterpart 19782020.2 (3,762,578) Nov. 22, 2021 (13 pages).
European Extended Search Report in European Counterpart 19782020.2 (3,762,578) Feb. 25, 2022 (12 pages).
European Response to Extended Search Report in European Counterpart 19782020.2 (3,762,578) Sep. 26, 2022 (12 pages).
European Supplemental Response with Amendments in European Counterpart 19782020.2 (3,762,578) Apr. 23, 2024 (92 pages).
European Decision to Grant European Counterpart 19782020.2 (2 pages) Sep. 19, 2024.
Japanese Office Action in Counterpart 2020-547106 Apr. 23, 2023 with English Translation (8 pages.
Japanese Response to Office Action in Counterpart 2020-547105 Jul. 24, 2023 with English Claims (30 pages).
Japanese Second Office Action in Counterpart 2020-547105 Jan. 23, 2024 with English Translation (6 pages).
Japanese Response to Second Office Action in Counterpart 2020-547105 Apr. 23, 2024 (8 pages).
Japanese Notice of Allowance, Jul. 1, 2024 (3 pages).

* cited by examiner

Comparative Sample

Comparative Sample

FIRE-RESISTANT SEAL ASSEMBLIES

CROSS-REFERENCE TO RELATED APPLICATIONS

This continuation non-provisional patent application is a continuation application of U.S. Non-Provisional patent application Ser. No. 17/013,652, filed Sep. 7, 2020, which is a continuation application that claims priority under 35 U.S.C. § 120 to International Application No. PCT/US2019/021710, which designates the United States and was published in the English language, and this application further claims the benefit under 35 U.S.C. § 119(e) to U.S. Provisional Patent Application No. 62/640,961, filed Mar. 9, 2018. This application herein incorporates by reference the entire disclosures of International Application No. PCT/2019/021710 and Provisional Patent Application No. 62/650,961.

BACKGROUND OF THE INVENTION

Field of the Invention

The present invention relates to seal assemblies. Specifically, the present invention relates to fire-resistant seal assemblies that are particularly suited for use in hydraulic actuators and other components in a fire zone, such as a fire zone of an aircraft engine.

Description of Related Art

Fire-resistant and/or fireproof seals are required in various industries and environments. Fire-resistant seals are often used in aircraft engine components, such as thrust reverser systems, hose couplings, and fuel pumps, as well as in other aircraft areas that may be exposed to fire conditions. When a fire event occurs in or around an aircraft engine, hydraulic actuators and other hydraulic or fuel handling components cannot be allowed to leak fluid that would propagate the fire. Accordingly, seals for hydraulic and fuel handling components must be designed to withstand high temperatures and exposure to flames to ensure that fluid does not leak from these components.

Seals used in aircraft engine components must meet industry standards for "fire-resistance" or "fire-proofing" which generally require that a fire seal maintain a seal when exposed to a flame for a fixed period of time, such as five minutes or fifteen minutes. Industry standards include the fire testing requirements set forth in DO-160G (Environmental Conditions and Test Procedures for Airborne Equipment) published by the Radio Technical Commission for Aeronautics (RTCA), the Federal Aviation Administration (FAA) Advisory Circular 20-135 (Powerplant Installation and Propulsion System Component Fire Protection Test Methods, Standards and Criteria), the FAA Advisory Circular 33.17-1A (Engine Fire Protection 33.17), and ISO 2685 (Aircraft—Environmental Test Procedure for Airborne Equipment—Resistance to Fire in Designated Fire Zone). RTCA/DO-160G provides that "fire-resistance" requires that the component "must not cause hazardous conditions during five minutes of fire without structural degradation. For fluid handling components there shall be no leakage to support a flame after the burner has been removed." While there is some variation among the different standards, common fire test parameters for testing components to be used in fire zones include testing at operating pressure with a flame temperature of 1,100° C. (2,012° F.)±80° C. (176° F.) and a minimum flame heat flux density of 4,500 BTU/hour. Newer standards under AC 20-135 and FAA (and TCCA) interpret "fireproof" materials to be capable of withstanding 2000° F. flame (±150° F.) for at least 15 minutes, or 2000° F. minimum on average with no thermocouple reading below 1850° F. during calibration.

Conventional solutions for providing fire-resistance generally include the use of fire barriers or external shielding for a hydraulic unit or other similar component in a fire zone of an aircraft, while conventional seals are used for fluid components inside the hydraulic units. Fire barriers are generally configured to help to prevent a fire from reaching an aircraft engine and from spreading to other parts of the aircraft. A fire barrier is disclosed in U.S. Pat. No. 4,468,043 which describes a high temperature seal structure to be positioned between opposing faces or parts in an aircraft, such as between the body of an aircraft and the engine nacelle. The high temperature seal includes a long spring member that is laterally compressible, an outer circular cover of an ablative material, and an inner core of a high temperature resistant material. The cover acts as a thermal barrier and the core thereof serves as a heat and flame barrier.

Other fire barrier-type devices include U.S. Patent Application Publication No. 2014/0075948 which discloses a fire seal for sealing gaps between turbine engine components to prevent an engine fire from spreading to another part of the turbine engine. The fire seal includes a molded body with a base portion and a curved portion extending therefrom. The fire seal further includes a metal seal support that surrounds the base portion and a radially inward surface of the curved portion.

U.S. Pat. No. 5,251,917 discloses a fire-resistant seal for use in aircraft engines to maintain an effective heat and flame barrier in areas where there is relative movement between the aircraft engine nacelle and the engine support structures. The fire seal is formed of an inner layer of elastomer material, a middle layer of ceramic fiber that is fire resistant, and an outer layer of elastic fabric. The fire resistant seal may have a toroidal-shaped compressible portion and an integrally formed flange portion.

Similarly, external shielding has been positioned on or around a hydraulic unit in order to prevent or minimize heating of the hydraulic unit and to prevent the hydraulic unit from being directly exposed to flames. While fire barriers and external shielding help to prevent the spread of a fire from reaching a hydraulic unit and/or prevent heating of the hydraulic unit, space constraints typically make the use of fire barriers and external shielding difficult or impractical. Further, external fire protection solutions do not prevent fluid from leaking from the hydraulic component in a fire event so as to accelerate the fire event.

Fire seals are known for use within a hydraulic component. Such seals generally include either typical O-ring seals or metallic seals. Metallic seals are generally constructed entirely of metal or alloys and are often in the form of C- or E-shaped seals that can be used at all temperature levels. Seals formed using metal provide good high temperature resistance and are often used as face seals in engine hosing and engine couplings that are regularly exposed to high temperature conditions. However, metal seals generally have poor leakage control because of a metal-to-metal interface and are not frequently used in rod- or piston-type sealing applications. Further, metal seals are expensive and can be difficult to install, particularly in closed glands.

One fire seal solution for use within a hydraulic component is a seal design of the present Applicant as described in the press release "Greene, Tweed Develops New Line of Flame Resistant Sealing Systems for Commercial Aircraft," Greene, Tweed (June 2015), and also in "Design Techniques to Protect Elastomeric Seals During Engine Fire Tests," ASTN Aerospace Sealing Technology Newsletter, vol. 10, no. 1 (Spring 1994), the disclosures of which are incorporated herein by reference in relevant part. These publications disclose a fire seal assembly having an L-shaped elastomeric seal and a cammed back-up ring assembly for providing extrusion-resistance at temperatures in excess of 1000° F. The cammed back-up ring assembly includes an inboard or inner back-up ring of a filled thermoplastic material and an outboard or outer back-up ring composed of a copper alloy.

Additionally, U.S. Pat. No. 3,869,132 of Taylor et al. discloses a sealing ring combination for confining fluids at high temperature and pressure that operates as a fail-safe in the event of a fire. Such sealing ring combinations are taught for use in hydraulic piping systems in aircraft. The sealing ring combination includes a primary elastomeric sealing ring and a secondary deflectable metallic sealing ring having curved leg portions which at least partially surround a portion of the elastomeric sealing ring.

Due to the critical nature of maintaining a seal and preventing the spread of fire, particularly in an aircraft, there is a need in the art for fire-resistant seal assemblies for use in hydraulic and fuel handling components that can reliably and consistently maintain a seal at high temperatures and for longer periods of time during a fire event. Fire-resistant seal solutions are also desired that provide sufficient fire-resistance at a reduced cost relative to conventional fire-seal solutions.

There is further a need in the art for a fire-resistant seal assembly that is suitable for use in hydraulic and fuel handling components in a fire zone in an aircraft, or in fire zones in other environments to prevent leakage of fluids from the component which would accelerate a fire or cause part failure. Further, there is a need for a fire-resistant seal assembly that has a simple design, improved fire-resistance, and improved fluid sealing relative to existing methods for protecting components from fires and existing methods for providing fire-proofing or fire-resistance. Additionally, there is a need in the art for fire-resistant seal assemblies that meet or achieve the fire-resistance and/or fire-proofing standards set by aircraft and/or engine manufacturers and provide reliable sealing during fire events without the need for external shielding or metal fire-seals.

BRIEF SUMMARY OF THE INVENTION

The present invention relates to seal assemblies, particularly those suited for use in hydraulic components within a fire zone of an aircraft. The present invention includes assemblies that are at a minimum, fire-resistant and also in some embodiments fireproof. As used herein, the terms "fire-resistant" or "fire-resistance" are intend to achieve a level that at least meets the definitions of "fire-resistant" as defined by the standards noted above, and in some instances also achieves the level of "fireproof" as that term is defined in those same standards, such that reference to "fire-resistant" seal assemblies herein would encompass seal assemblies that are at least fire-resistant and/or are also fireproof unless otherwise indicated in a particular instance. Whereas reference solely to "fireproof" (as opposed to "fire-resistant") is intended to convey that a high level of "fire-resistance" that achieves the level of "fireproof" is applies.

The invention herein includes a fire-resistant seal assembly that comprises a first seal comprising an elastomeric material; a first anti-extrusion seal having a first seal-facing surface for receiving the first seal, wherein the first seal-facing surface defines a groove extending along the first seal-facing surface, and an exterior surface that, when viewed in a longitudinal cross section, has a truncated V-shaped portion and beveled end portions configured for sealing contact with a gland; at least one second anti-extrusion seal having a second seal-facing surface for receiving the first anti-extrusion seal, wherein the second seal-facing surface defines a groove extending along the second seal-facing surface, and an exterior surface that, when viewed in a longitudinal cross section, has a truncated V-shaped portion and beveled end portions configured for sealing contact with a gland, wherein the exterior surface of the first anti-extrusion seal is positioned at least partially within the groove of the at least one second anti-extrusion seal such that a portion of the exterior surface of the first anti-extrusion seal contacts the second seal-facing surface of the at least one second anti-extrusion seal; and at least one backer ring having a third seal-facing surface for receiving the at least one second anti-extrusion seal, wherein the third seal-facing surface defines a groove extending along the third seal-facing surface, and an exterior surface that, when viewed in a longitudinal cross section, has a truncated V-shape, wherein the exterior surface of the at least one second anti-extrusion seal is positioned at least partially within the groove of the at least one backer ring such that a portion of the exterior surface of the at least one second anti-extrusion seal contacts the third seal-facing surface of the at least one backer ring.

In one embodiment of the above first resistant seal assembly, the assembly is fireproof. In a further embodiment thereof, the first seal may be annular and may have a generally circular longitudinal cross-sectional area. The elastomeric material of the first seal may be selected from the group of ethylene propylene rubbers (such as ethylene propylene rubber (EPM) and ethylene propylene diene (EPDM)), nitrile rubber, silicone, fluorosilicone, a fluoroelastomer, and a perfluoroelastomer. Preferably, the elastomeric material is selected from ethylene propylene rubber, nitrile rubber, and fluoroelastomers.

The groove defined by the first seal-facing surface of the first anti-extrusion seal may extend annularly around the first seal-facing surface of the first anti-extrusion seal. The first seal-facing surface of the first anti-extrusion seal may be generally V-shaped in a longitudinal cross sectional view. When the first seal-facing surface is generally V-shaped in a longitudinal cross sectional view, the first seal-facing surface may comprise a first leg and a second leg, wherein the first leg and second leg intersect at an intersection point, and wherein an angle measured between the first leg and the second leg from the intersection point is about 60 to about 120 degrees. Preferably, the angle measured between the first leg and the second leg is about 80 to about 100 degrees. The first leg and second leg may intersect at a radiused bend in the first seal-facing surface.

The first anti-extrusion seal comprises in an embodiment herein a first polymeric material which may be a thermoplastic or a thermosetting polymeric material. The first polymeric material may be selected from the group of polytetrafluoroethylene (PTFE), a polyaryletherketone (PAEK), a polyether sulfone (PES), a polyphenylene sulfide (PPS), a polyimide (PI), and copolymers, derivatives and combinations thereof. Preferably, the first polymeric material is polytetrafluoroethylene (PTFE). In some embodiments, the first polymeric material includes a filler material and/or a reinforcing material.

The at least one second anti-extrusion seal(s) each preferably comprise a second polymeric material that also may be a thermoplastic or thermosetting polymeric material and may be the same or different from the first polymeric material. If there are more than one second anti-extrusion seal(s), they may include the same or different materials which are preferably selected from the second polymeric materials noted above. Preferably, the second polymeric material has a higher decomposition temperature than a decomposition temperature of the first polymeric material of the first anti-extrusion seal. In a preferred embodiment, he second polymeric material may be chosen from the group of a polyaryletherketone (PAEK) (such as, e.g., polyetheretherketone (PEEK)), a polyether sulfone (PES), a polyphenylene sulfide (PPS), a polyimide (PI), and copolymers, derivatives and combinations thereof. Preferably, the second polymeric material is a polyetheretherketone (PEEK). The second polymeric material may include a filler material and/or a reinforcing material.

The first anti-extrusion seal may comprise a first polymeric material, each of the at least one second anti-extrusion seal may comprise one of the second polymeric material, and the at least one backer ring may comprise a third material that is more rigid than either of the first or second polymeric materials. The third material of the at least one backer ring may comprise a high modulus plastic or more preferably a metal or metal alloy, such as an aluminum-nickel-bronze alloy or brass, among others. The at least one backer ring may have a substantially uniform thickness, wherein the thickness is measured from the third seal-facing surface of the at least one backer ring along an axis perpendicular to the third seal-facing surface through the at least one backer ring to the exterior surface thereof. The at least one backer ring may comprise two backer rings, wherein the backer rings are stacked in facing engagement.

The fire-resistant seal assembly as described herein may have a unidirectional configuration or may have a bidirectional configuration.

The fire-resistant seal assembly may be constructed such that when the fire-resistant seal assembly is installed in a gland of a hydraulic component and the hydraulic component is exposed to a flame having a temperature of about 2000° F., the fire-resistant seal assembly maintains a seal for at least about 6 minutes prior to failure of the fire-resistant seal assembly, and in preferred embodiment maintains a seal for at least about 15 minutes prior to failure of the fire-resistant seal assembly.

In one embodiment, the fire-resistant seal assembly has three anti-extrusion seals, such that a third anti-extrusion seal is situated between the first anti-extrusion seal and the at least one second anti-extrusion seal.

The present invention further relates to fire-resistant hydraulic components comprising a hydraulic component having a fire-resistant seal assembly as described herein that is configured to prevent leakage of a hydraulic fluid from the hydraulic component. The hydraulic component may be a hydraulic actuator, among others.

The present invention also relates to methods of improving fire-resistance in a hydraulic component, comprising installing a fire-resistant seal assembly as described herein in a gland of a hydraulic component. When the fire-resistant seal assembly is installed in the gland of a hydraulic component and heated, the maximum internal temperature of the hydraulic component at failure of the fire-resistant seal assembly is preferably at least about 1075° F., and more preferably at least about 1175° F.

According to a further embodiment of the present invention, the present invention relates to a fire-resistant seal assembly that comprises a first seal comprising an elastomeric material; a first anti-extrusion seal having a first seal-facing surface for receiving the first seal, wherein the first seal-facing surface defines a groove extending along the first seal-facing surface, and an exterior surface, wherein the first anti-extrusion seal comprises a first polymeric material having a higher decomposition temperature than a decomposition temperature of the elastomeric material of the first seal; at least one second anti-extrusion seal having a second seal-facing surface for receiving the first anti-extrusion seal, wherein the second seal-facing surface defines a groove extending along the second seal-facing surface, and an exterior surface, wherein the second seal-facing surface faces the exterior surface of the first anti-extrusion seal, and wherein the at least one second anti-extrusion seal comprises a second polymeric material having a higher decomposition temperature than the decomposition temperature of the first polymeric material; and at least one backer ring having a third seal-facing surface for receiving the at least one second anti-extrusion seal, wherein the third seal-facing surface defines a groove extending along the third seal-facing surface, and an exterior surface, wherein the third seal-facing surface of the at least one backer ring faces the exterior surface of the at least one second anti-extrusion seal, and wherein the at least one backer ring comprises a metal or metal alloy.

The first polymeric material and second polymeric material may be any of the materials as described above for the first and second anti-extrusion seals, respectively. The first seal, the first anti-extrusion seal, the second anti-extrusion seal and the at least one backer ring are preferably arranged in a stacked configuration, and with respect to the at least one second anti-extrusion seal, when there are two or more such seals, they may be the same or different, and are both preferably chosen from the second polymeric materials noted above. The exterior surface of the first anti-extrusion seal when viewed in a longitudinal cross section, may have a truncated V-shaped portion and beveled end portions configured for sealing contact with a gland. In a further embodiment, the first seal-facing surface of the first anti-extrusion seal is generally V-shaped in a longitudinal cross sectional view.

In another embodiment of the present invention, the present invention relates to a fire-resistant seal assembly comprising a first seal comprising an elastomeric material; at least one solid anti-extrusion seal having a seal-facing surface for receiving the first seal, wherein the seal-facing surface defines a groove extending along the seal-facing surface, the seal-facing surface having a generally V-shaped configuration in a longitudinal cross sectional view, and an exterior surface that when viewed in a longitudinal cross section has a truncated V-shaped portion and beveled end portions configured for sealing contact with a gland, wherein the seal-facing surface faces the first seal such that at least a portion of the first seal is in contact with the seal-facing surface, and wherein the at least one solid anti-extrusion seal comprises polyetheretherketone (PEEK), such that when the fire-resistant seal assembly is installed in a hydraulic component and heated, a maximum internal temperature of the hydraulic component at failure of the seal assembly is at least about 1020° F. In one embodiment of such assembly, there is only one solid anti-extrusion seal.

In a further embodiment, the present invention relates to a fire-resistant seal assembly that comprises a first seal comprising an elastomeric material; a first anti-extrusion seal having a first seal-facing surface for receiving the first seal, wherein the first seal-facing surface defines a groove extending along the first seal-facing surface, and an exterior surface that when viewed in a longitudinal cross section, has a truncated V-shaped portion and beveled end portions configured for sealing contact with a gland, wherein the first anti-extrusion seal comprises a first polymeric material; at least one second anti-extrusion seal having a second seal-facing surface for receiving the first anti-extrusion seal, wherein the second seal-facing surface defines a groove extending along the second seal-facing surface, and an exterior surface that when viewed in a longitudinal cross section, has a truncated V-shaped portion and beveled end portions configured for sealing contact with a gland, wherein the exterior surface of the first anti-extrusion seal is positioned at least partially within the groove of the at least one second anti-extrusion seal such that a portion of the exterior surface of the first anti-extrusion seal contacts the second seal-facing surface of the at least one second anti-extrusion seal, wherein the at least one second anti-extrusion seal comprises a second polymeric material having a higher decomposition temperature than a decomposition temperature of the first polymeric material; and one backer ring having a third seal-facing surface for receiving the at least one second anti-extrusion seal, wherein the third seal-facing surface defines a groove extending along the third seal-facing surface, and an exterior surface, wherein the at least one second anti-extrusion seal is positioned at least partially within the groove of the backer ring such that a portion of the exterior surface of the second anti-extrusion seal contacts the third seal-facing surface of the at least one backer ring, and wherein the backer ring comprises a polymeric material having a higher decomposition temperature than the decomposition temperature of the second polymer material.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
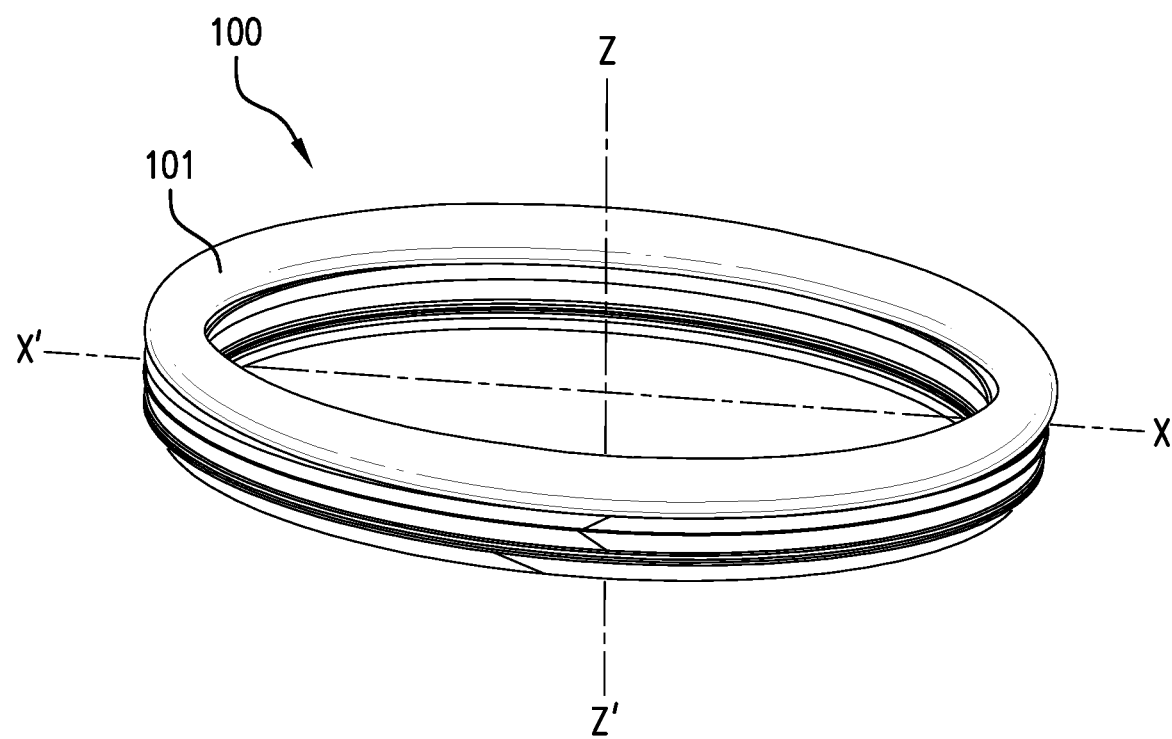
FIG. 1 is a perspective view of an embodiment of the fire-resistant seal assembly of the present invention.

The present invention relates to seal assemblies. The seal assemblies are particularly useful in hydraulic components in a fire zone, such as a hydraulic actuator within a fire zone of an aircraft. The seal assemblies of the present invention may be used in various other components in fire zones, such as thrust reverser actuation systems (TRAS), fuel or fluid lines and couplings, and other fuel handling components in an aircraft engine. A "fire zone" is an area of an aircraft designated by the manufacturer to require fire detection and/or fire extinguishing equipment and a high degree of inherent fire-resistance. Fire zones in an aircraft include but are not limited to engines, auxiliary power units (APUs), cargo and baggage compartments, lavatories, electronic bays, wheel wells, and bleed air ducts, among others. While the use of the seal assemblies are primarily described in relation to fire zones in aircraft, the seal assemblies of the present invention may also be suited for use in other environments where fire-resistance is desired. Further, the seal assemblies may be used in applications where the unit in which the seal assembly is installed is subject to high temperatures, such as 800° F. or greater, as a single event prior to the unit being rendered inoperable.

When installed, the seal assemblies of the present invention are configured to prevent leakage of hydraulic fluid from a hydraulic component during operating conditions, and to maintain a seal for a period of time during fire conditions. In order to address the drawbacks identified in the prior art, the seal assemblies of the present invention are configured to provide consistent and reliable sealing through a range of temperatures and conditions. Further, the seal assemblies of the present invention provide fire-resistance, and in preferred embodiments fire-proofing, without the use of external shielding or all metal seals, which allows for the cost of production of the seal assemblies to be reduced or minimized relative to conventional solutions for providing fire-protection for hydraulic components. The seal assemblies of the present invention also provide improved fire-resistance relative to conventional fire-seals, and preferably are also fire-proof. The terms "fire-resistant" or "fire-resistance" as well as "fire-proof" as used herein shall be defined as set forth above and as defined in the applicable industry standards, such as RTCA/DO-160G and ISO 2685 discussed above and the FAA regulations.

As used herein, words such as "inner" and "outer," "upper" and "lower," "top" and "bottom," "left" and "right," "inwardly" and "outwardly," and words of similar import are intended to assist in understanding preferred embodiments of the invention with reference to the accompanying Figures and with respect to the orientation of the sealing assemblies as shown in the Figures, and are not intended to be limiting to the scope of the invention or to limit the invention scope to the preferred embodiments shown in the Figures. The embodiments herein each use like reference numerals to refer to analogous features of the invention as described herein and as shown in the drawings, such that absent language to the contrary describing alternate configurations for a particular feature, one skilled in the art would understand, based on this disclosure and the drawings attached hereto, that description of one such feature is applicable to an analogous feature in another embodiment herein unless otherwise specified.

Further, as used herein, the terms "a" and "at least one" can mean "one or more" absent language to the contrary, such as language indicating a specific number.

Referring now to FIGS. 1-7B, there are shown views of an embodiment of a fire-resistant seal assembly according to the present invention, generally referred to herein as assembly 100. An axis, Z-Z', is defined as the axis extending longitudinally through the center of the fire-resistant seal assembly 100, as shown in FIG. 1. A second axis, X-X', is defined as an axis extending radially from the center of the fire-resistant seal assembly 100 and perpendicular to the Z-Z' axis. A longitudinal cross section of the fire-resistant seal assembly 100 is defined as a cross section taken through the fire-resistant seal assembly 100 by a plane (X-Z) formed by the X-X' and Z-Z' axes. A transverse cross section is a section taken through a plane including the X-X' axis that is orthogonal to plane X-Z.

Figure 2:
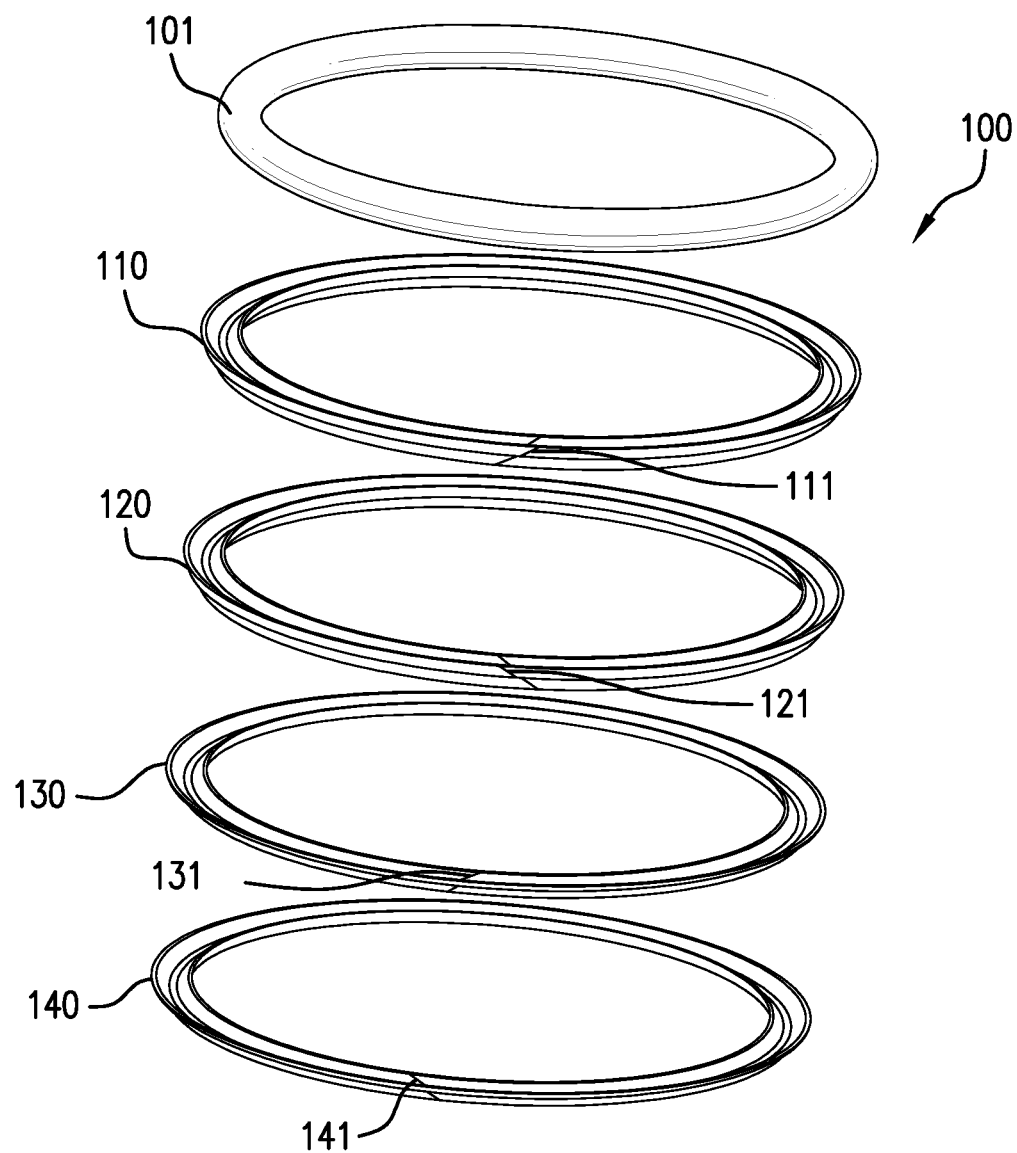
FIG. 2 is an exploded perspective view of the fire-resistant seal assembly of FIG. 1.

Referring now to FIG. 2, the fire-resistant seal assembly 100 includes a first seal 101, a first anti-extrusion seal 110, at least one second anti-extrusion seal 120, and at least one backer ring 130. In the illustrated embodiment, only one second anti-extrusion seal 120 is shown (however, two are more are within the scope of the invention), and only two backer rings 130, 140 are shown (but more or less could be incorporated). The seals 110, 120, 130, 140 are preferably arranged in a stacked configuration in the Z-direction on an atmosphere or low-pressure side of the first seal 101, such that the seal assembly 100 as shown is unidirectional in configuration.

Each seal 110, 120, 130, 140 may independently be a solid seal or a split seal. A "solid seal" is defined as a single, continuous annular body with no breaks, cuts, splits or the like. Solid seals generally are not suited for use when the gland in which the seal is to be installed is composed of a single piece of hardware and is "closed." In hardware having a gland formed from two or more components, a solid seal may be used. A "split seal" is defined as a seal having one or more cuts, and is formed as a single, continuous body having a first end and a second end, wherein the first end and second end can be placed in facing engagement so as to form an annular seal. In the illustrated embodiment, the anti-extrusion seals 110, 120 and the backer rings 130, 140 are shown as split seals so as to facilitate installation and replacement of each seal. Each split seal includes a cut 111, 121, 131, 141. An example of a split is shown in FIG. 2 as a scarf cut, although the type of cut may vary. The cut may be made through each seal along the X-Z plane, or at an angle relative to the X-Z plane, such as at a 30 degree angle relative to the X-Z plane, among other angles. Further, the cuts in adjacent seals may be formed at opposing angles, e.g., the first anti-extrusion seal may have a cut formed at a 30 degree angle relative to the X-Z plane, while the adjacent, second anti-extrusion seal may have a cut formed at a 150 degree angle relative to the X-Z plane. This helps to prevent the cuts in adjacent seals from overlapping or interfering with one another.

If incorporated, the cuts in adjacent seals in the seal assembly 100 are preferably circumferentially offset from one another around a circumference of the seal by about 90 degrees, and more preferably by about 180 degrees. In this way, the cuts in adjacent seals are displaced from one another. The cut of a seal provides a potential passageway for leakage of fluid through the seal assembly 100, and by offsetting cuts in successive or adjacent seals propagation of leaks through the seal assembly 100 is inhibited.

Figure 3:
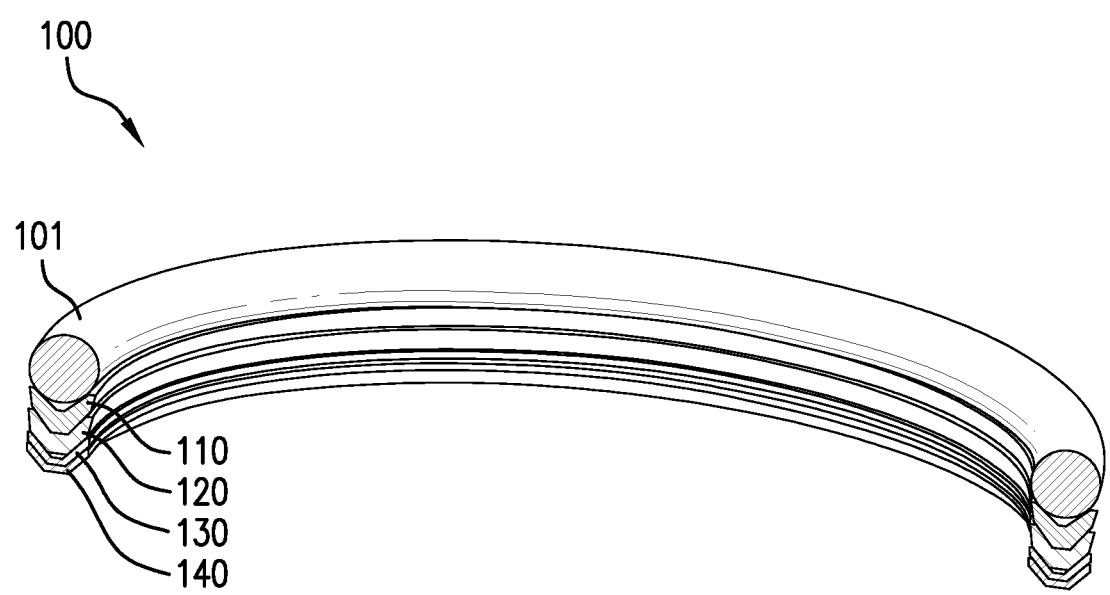
FIG. 3 is a perspective view of a longitudinal cross section of the fire-resistant seal assembly of FIG. 1.
Figure 4:
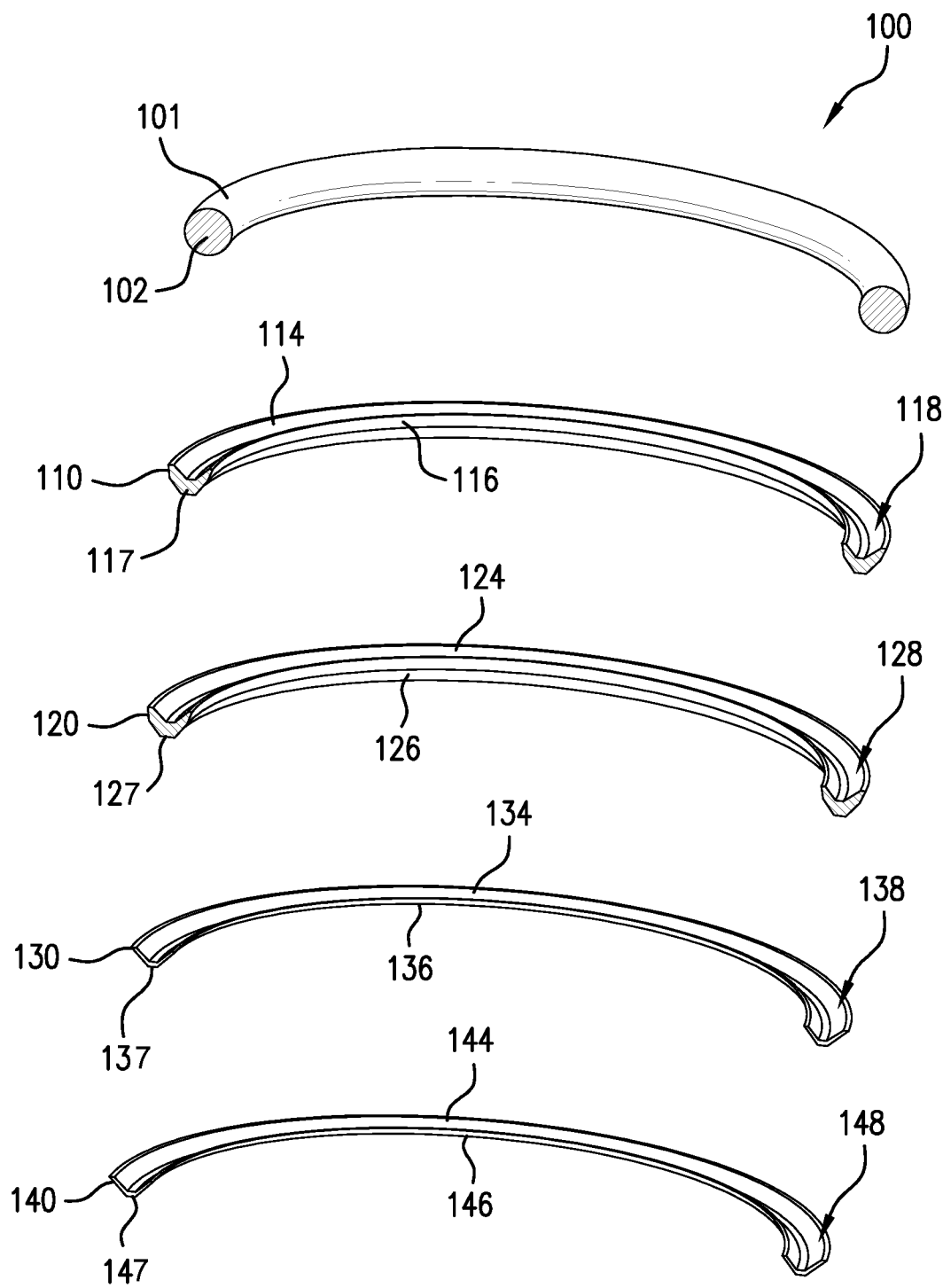
FIG. 4 is an exploded perspective view of a longitudinal cross section of the fire-resistant seal assembly of FIG. 3.

Referring now to FIGS. 3 and 4, there are shown perspective views of the longitudinal cross sections of the seals in the seal assembly of FIG. 1. The first seal 101 as shown is preferably annular in configuration and is generally circular in its longitudinal cross-section 102. The first seal 101 may be an O-ring. In some embodiments, the first seal 101 may have a longitudinal cross section 102 that is octagonal, heptagonal, hexagonal, elliptical, oval, or a truncated V-shape with beveled end portions. The first seal 101 is preferably formed from an elastomeric material, such as ethylene propylene diene (EPDM) rubber or other ethylene propylene (EPM) rubbers, nitrile rubber, silicone, fluorosilicone, fluoroelastomers, or perfluoroelastomers, among other suitable materials which may be selected depending upon the application, operating temperature, fluid media compatibility, dynamic versus static conditions, and other relevant sealing use factors. Preferably, the elastomeric material is an ethylene propylene rubber, a nitrile rubber, or a fluoroelastomer.

The elastomeric material of the first seal 101 is selected to provide a seal and prevent leakage at ordinary operating temperatures and pressures, and does not contribute significantly to the fire-resistant properties of the seal assembly 100. The elastomeric material is selected based upon the expected operating temperature, fluid media compatibility, and depending upon whether the seal assembly is used in static or dynamic conditions, as will be appreciated by one skilled in the art. For example, where the fluid media is Skydrol® or other phosphate ester-based fluids, the elastomeric material may be an EPM rubber. When the fluid media is a jet fuel, the elastomeric material may be a fluoroelastomer or perfluoroelastomer.

Figure 5:
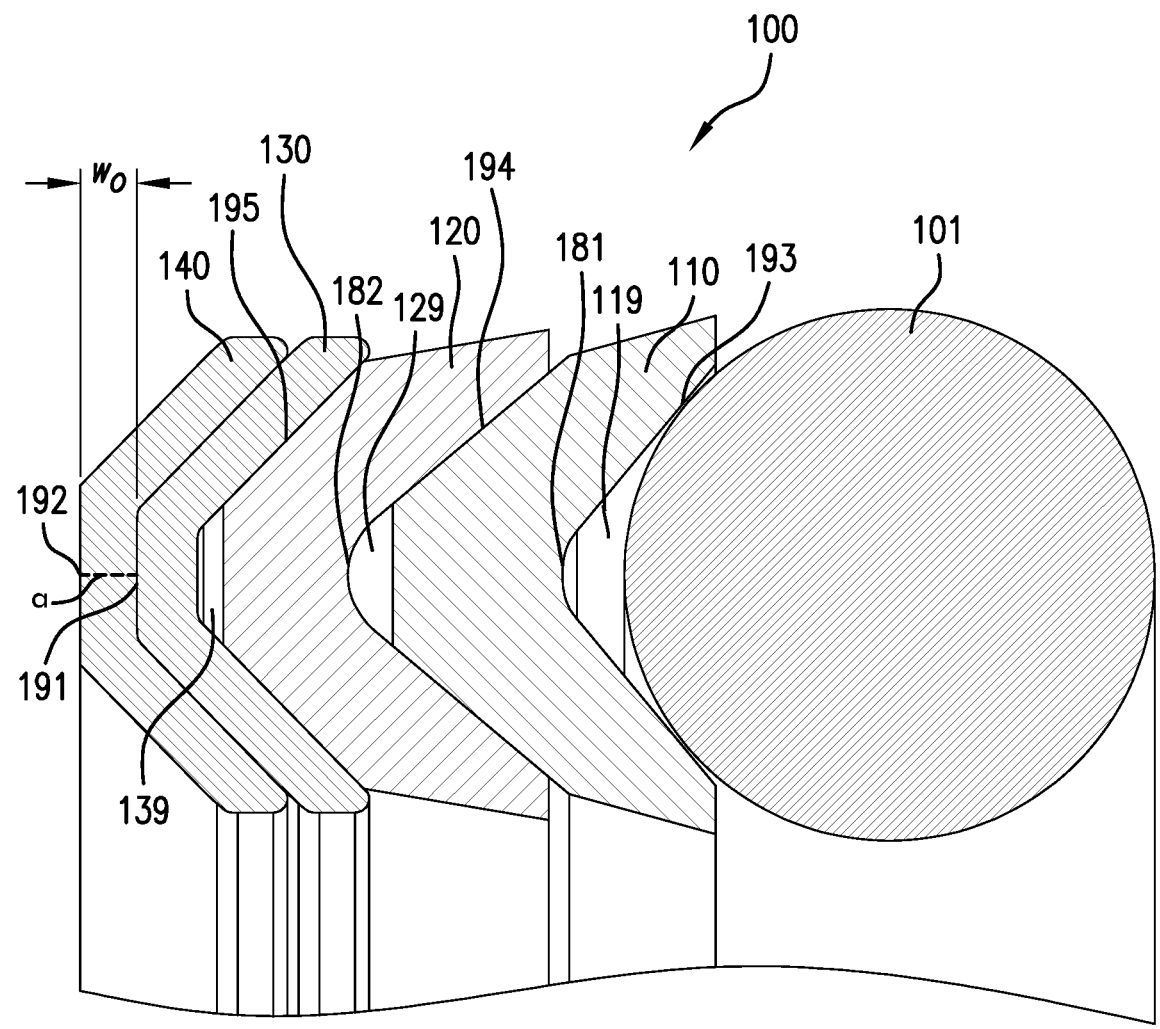
FIG. 5 is an enlarged longitudinal cross sectional view of the fire-resistant seal assembly of FIG. 1.
Figure 6:
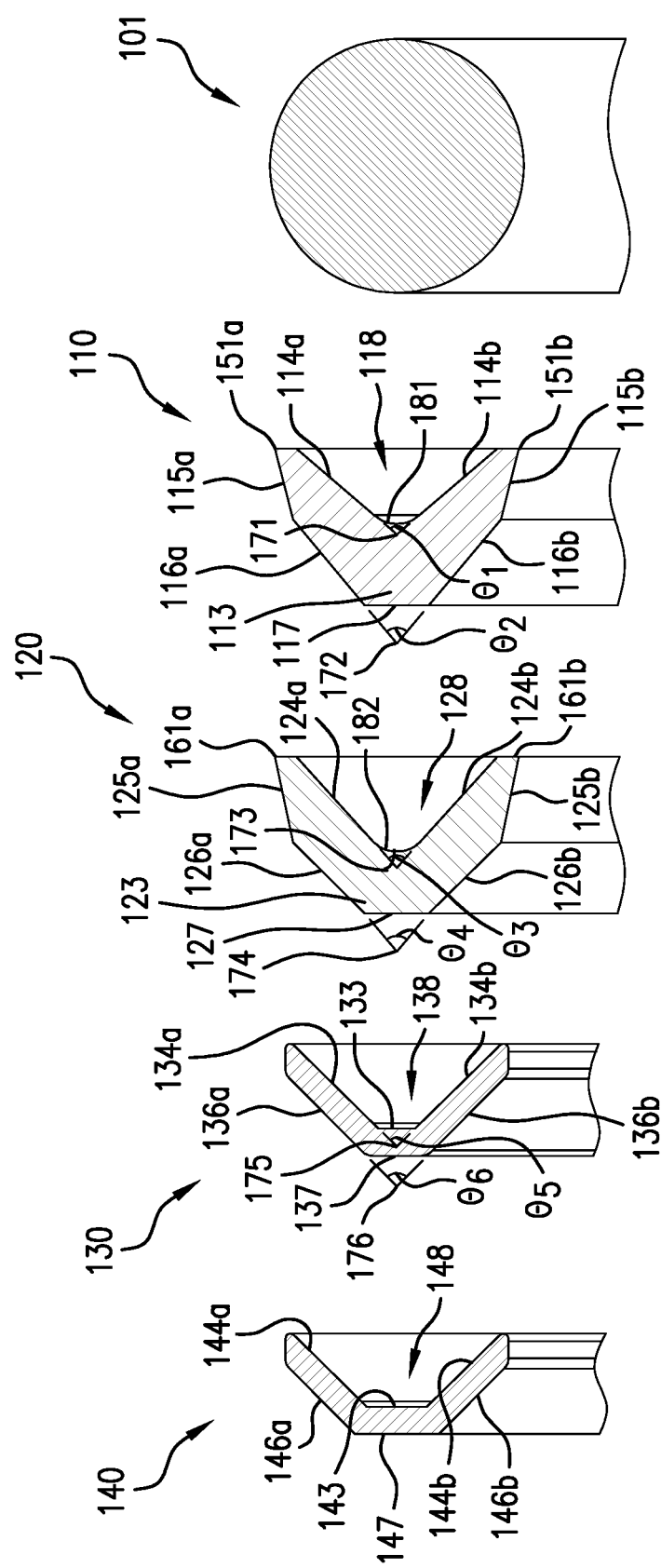
FIG. 6 is an exploded longitudinal cross sectional view of the fire-resistant seal assembly of FIG. 5.

As shown in FIGS. 4-6, the first anti-extrusion seal 110 has an exterior surface 116, and a first seal-facing surface 114 for receiving the first seal 101. The first seal-facing surface 114 defines a groove 118 that extends along the first seal-facing surface 114. The groove 118 preferably extends annularly around the first seal-facing surface 114. In some embodiments, the first seal-facing surface 114 is generally V-shaped in a longitudinal cross sectional view, and includes a first leg 114*a* and a second leg 114*b* that intersect at a point or that are connected by a radiused bend 181. The first seal 101 is received by the first seal-facing surface 114 such that the first seal 101 contacts at least a portion 193 of the first seal-facing surface 114. It will be understood by those skilled in the art that a similar contact portion to portion 193 would preferably also be found on the lower leg 114*b* of the seal and that multiple contact portions could be formed depending on the design of the seal. At least a portion of the first seal 101 is positioned within the groove 118, and the first seal 101 is configured to form a seal with the gland (as shown for example in FIG. 7A) in which the seal assembly 100 is positioned. The degree to which the first seal 101 is positioned within the groove 118 and the points of contact may be varied somewhat depending on the specific configurations chosen for the first seal 101 and the first anti-extrusion seal 110 in variations of the embodiment herein within the scope of the invention.

In a longitudinal cross-sectional view, the exterior surface 116 of the first anti-extrusion seal 110 has a truncated V-shaped portion 113 and beveled end portions 115*a*, 115*b*. The truncated V-shaped portion 113 includes a first leg 116*a* and a second leg 116*b* separated by a truncated segment 117. The beveled end portions 115*a*, 115*b* extend from the truncated V-shaped portion 113 and taper towards the first seal-facing surface 114. The beveled end portions 115*a*, 115*b* are configured for sealing contact with a gland in which the seal assembly 100 is positioned (as shown for example in FIG. 7A). The beveled end portions 115*a*, 115*b* may each form an apex 151*a*, 151*b* for sealing contact with the gland, the apex 151*a*, 151*b* being an outermost peak or point on the beveled end portion 115*a*, 115*b* in a radial direction, or can be a rounded or softer bend so long as sealing contact can be made. Contact may be made with the gland at least at the apex points and/or a portion of the bevel depending on the seal design used herein.

A second anti-extrusion seal 120 is shown in embodiment 100 as well. However, it is within the scope of the invention, as discussed further below to incorporate more than one second anti-extrusion seal in an assembly herein. In the example embodiment shown in FIGS. 1-7A, where on second anti-extrusion seal is illustrated, the second anti-extrusion seal 120 has an exterior surface 126, and a second seal-facing surface 124 for receiving the first anti-extrusion seal 110. The second seal-facing surface 124 defines a groove 128 extending along the second seal-facing surface 124. The groove 128 preferably extends annularly around the second seal-facing surface 124. In some embodiments, the second seal-facing surface 124 is generally V-shaped in a longitudinal cross sectional view. The second seal-facing surface 124 preferably includes a first leg 124*a* and a second leg 124*b*. The first leg 124*a* and second leg 124*b* of the second seal-facing surface 124 may intersect at a point, or may be connected by a rounded or radiused bend 182.

The exterior surface 116 of the first anti-extrusion seal 110 is positioned at least partially within the groove 128 of the second anti-extrusion seal 120, such that a portion(s) 194 of the exterior surface 116 of the first anti-extrusion seal 110 contacts the second seal-facing surface 124 of the second anti-extrusion seal 120. As noted above, more than one point or portion of contact may be present. The first leg 116*a* and second leg 116*b* of the exterior surface 116 of the first anti-extrusion seal 110 may be configured so as to be in facing engagement with the first leg 124*a* and second leg 124*b* of the second seal-facing surface 124 of the second anti-extrusion seal 120, respectively. When the first anti-extrusion seal 110 is positioned at least partially within the groove 128, the beveled end portions 115*a*, 115*b* extend outwardly from the groove 128 of the second anti-extrusion seal 120 and are configured for sealing contact with the walls of a gland in which the seal assembly 100 is positioned.

In a longitudinal cross sectional view, the exterior surface 126 of the second anti-extrusion seal 120 has a truncated V-shaped portion 123 and also has beveled end portions 125*a*, 125*b*. The truncated V-shaped portion 123 includes a first leg 126*a* and a second leg 126*b* separated by a truncated segment 127. The beveled end portions 125*a*, 125*b* extend from the truncated V-shaped portion 123 and taper towards the second seal-facing surface 124. The beveled end portions 125*a*, 125*b* are configured for sealing contact with a gland in which the seal assembly 100 is positioned (as shown for example at FIG. 7A). The beveled end portions 125a, 125b may further include an apex 161a, 161b configured for sealing contact with a gland, the apex 161a, 161b being an outermost peak or point on the beveled end portion 125a, 125b in a radial direction, or can be a rounded or softer bend so long as sealing contact can be made. Contact with the gland may occur at the apex and/or some portion of the beveled end portions depending on the seal configuration.

The first anti-extrusion seal 110 is preferably formed from a first polymeric material that has a higher decomposition temperature than a decomposition temperature of the elastomeric material of the first seal 101. The "decomposition temperature" can be defined as the temperature at which the seal decomposes, deteriorates or otherwise ultimately or irreversibly fails such that the seal no longer is able to form a seal with the gland. In this way, when the fire-resistant seal assembly 100 is exposed to high temperatures or fire conditions, the first anti-extrusion seal 110 can form a seal after the first seal 101 has degraded or otherwise failed. Similarly, the second anti-extrusion seal 120 is preferably formed of a second polymeric material that has a higher decomposition temperature than the decomposition temperature of the first polymeric material so as to provide a seal when the first anti-extrusion seal 110 has degraded or otherwise failed.

The first polymeric material may be a thermoplastic polymeric material or a thermosetting polymeric material. The first polymeric material is preferably selected from the group of polytetrafluoroethylene (PTFE), a polyphenylene sulfide (PPS), a polyethersulfone (PES), a polyimide (PI), or a polyaryletherketone (PAEK), such as polyetheretherketone (PEEK), polyetherketone (PEK), polyetherketonketone (PEKK), and polyetherketoneetherketoneketone (PEKEKK), as well as copolymers, derivatives and combinations of the above-noted polymers individually or together, among other thermoplastic or thermosetting polymeric materials. The first polymeric material may include a filler, a reinforcing material, or a combination of a filler and reinforcing material. Suitable fillers include carbon or glass particles or fibers, among other known fillers and reinforcing materials. The use of fillers and/or reinforcing materials provides improved resistance to degradation at higher temperatures relative to the virgin or unfilled thermoplastic or thermosetting polymeric material. In a preferred embodiment, the first anti-extrusion seal 110 is composed of Avalon® 89 or Arlon® 1263.

The second anti-extrusion seal 120 may be formed from the same polymeric material as the first anti-extrusion seal 110 to provide redundant sealing. However, the second anti-extrusion seal 120 is preferably composed of a second polymeric material that has a higher decomposition temperature than the first polymeric material used to form the first anti-extrusion seal 110. The second polymeric material may also be a thermoplastic or thermosetting polymeric material. Depending upon the selection of the first polymeric material, the second polymeric material is preferably selected from the group of a polyphenylene sulfide (PPS), a polyethersulfone (PES), a polyimide (PI), or a polyaryletherketone (PAEK), such as polyetheretherketone (PEEK), polyetherketone (PEK), polyetherketonketone (PEKK), polyetherketoneetherketonketone (PEKEKK), as week as copolymers, derivatives and combinations of these polymers individually or together, among other thermoplastic or thermosetting polymeric materials. The second polymeric material may be filled and/or reinforced, such as with carbon or glass particles or fibers to provide improved resistance to degradation at higher temperatures relative to the virgin or unfilled thermoplastic or thermosetting polymeric material. In a preferred embodiment, the second anti-extrusion seal 120 is composed of a filled, reinforced or enhanced polyetheretherketone (PEEK), such as Arlon® 1263 or Arlon® 3000XT. If more than one second anti-extrusion seal is used, each of such second anti-extrusion seals may be formed of the same or a different polymer, which is preferably one of the second polymeric material noted above.

In one embodiment of the seal assembly, the first polymeric material is a virgin or filled polytetrafluoroethylene (PTFE) material, and the second polymeric material is a polymeric material having a higher decomposition temperature or higher modulus than the first polymeric material, such as a polyaryletherketone (PAEK), and is more preferably a filled, reinforced or enhanced polyetheretherketone (PEEK).

The fire-resistant seal assembly 100 further includes at least one backer ring 130. In a preferred embodiment, two backer rings 130 and 140 are used, as shown for example in FIG. 5. The use of two backer rings 130, 140 provides good high temperature-resistance and fire-resistance, while minimizing the cost of producing the seal assembly 100. The two backer rings may be whole or split. If the two backer rings 130, 140 are split, the two backer rings 130, 140 may be arranged such that a cut in a first backer ring 130 is circumferentially offset from a cut in an adjacent, second backer ring 140 in order to inhibit leakage through the backer rings 130, 140. However, in alternate embodiments, the fire-resistant seal assembly 100 may include a single backer ring 130 or may have three or more backer rings 130. If a single backer ring is used, it preferably is not split, although a split single backer ring is within the scope of the invention. The backer ring(s) 130, 140 help to prevent the first and second anti-extrusion seals 110, 120 from extruding out of a gland in which the fire-resistant seal assembly 100 is installed when the seal assembly 100 is exposed to high temperatures and/or fire conditions. Further, the backer rings 130, 140 provide sealing at high temperatures.

Each backer ring 130, 140 (and any additional backer rings) has a third seal-facing surface 134, 144 for receiving the second anti-extrusion seal 120 (or another backer ring), and an exterior surface 136, 146. The third seal-facing surface 134, 144 defines a groove 138, 148 that extends along the third seal-facing surface 134, 144. Preferably, the groove 138, 148 extends annularly around the third seal-facing surface 134, 144. The third seal-facing surface 134, 144 may have a truncated V-shape in a longitudinal cross sectional view, such that the third seal-facing surface has a first leg 134a, 144a and a second leg 134b, 144b that are separated by a truncated segment 133, 143. The exterior surface 136, 146 of the backer ring 130, 140, when viewed in a longitudinal cross section, also has a truncated V-shape. The truncated V-shape of the exterior surface 136, 146 includes a first leg 136a, 146a and a second leg 136b, 146b separated by a truncated segment 137, 147. The exterior surface 126 of the second anti-extrusion seal 120 is positioned at least partially within the groove 138 of a first (or only) backer ring 130, such that at least a portion 195 of the exterior surface 126 contacts the third seal-facing surface 134 of the backer ring 130. The first leg 126a of the second anti-extrusion seal 120 may be in facing engagement with the first leg 134a of the third seal-facing surface 134 and the second leg 126b may similarly be in facing engagement with the second leg 134b of the third seal-facing surface. When the second anti-extrusion seal 120 is positioned at least partially within the groove 138 of a backer ring 130, the beveled end portions 125a, 125b extend outwardly from the groove 138 and are configured to contact the opposing walls of the gland to form a seal (as shown for example at FIG. 7A).

As shown in FIG. 5, each backer ring 130, 140 may have a substantially uniform thickness, wherein the thickness ($w_o$) of a backer ring 140 is measured from a point 191 on the third seal-facing surface 144 along a line (a) perpendicular to the seal facing surface 144 through the backer ring 140 to a point 192 on the exterior surface 146 of the backer ring 140. In some embodiments of the seal assembly, each backer ring(s) 130, 140 has a thickness of about 0.005 inches to about 0.015 inches. However, the backer ring(s) 130, 140 can be selected to have any thickness depending upon the overall dimensions of the seal assembly, the intended use of the seal assembly, and the desired level of fire-resistance.

In embodiments having multiple backer rings 130, 140, each backer ring 130, 140 preferably has the same shape and the same or similar dimensions. When multiple backer rings 130, 140 are used, as shown in FIG. 5, the backer rings 130, 140 may be arranged in a stacked configuration, such that a first backer ring 130 is positioned within the groove 148 of a second backer ring 140. In this way, the exterior surface 136 of the first backer ring 130 is in facing engagement with the third seal-facing surface 144 of the second backer ring 140, such that little to no gap or cavity is defined between successive backer rings 130, 140.

Each backer ring 130 of the fire-resistant seal assembly of the present invention is preferably composed of a rigid material, having a greater rigidity than either of the first or second polymeric materials used to form the first and second anti-extrusion seals 110, 120, respectively. In this way, the backer ring(s) 130 can support the first and second anti-extrusion seals 110, 120. The "rigidity" of the materials may be based upon the hardness of the material, such as the Shore hardness, and/or may be based on the modulus of elasticity. The backer rings 130, 140 are preferably composed of a metal or metal alloy, such as an aluminum-nickel-bronze alloy, C260 brass, or other suitable materials. In embodiments having multiple backer rings, each backer ring may be composed of a different material. For example, a first backer ring may be composed of an aluminum-nickel-bronze alloy while a second backer ring may be composed of C260 brass. The backer rings may be formed by stamping, machining or other forming methods, depending upon the material selected and upon the desired dimensions of the backer rings.

Backer rings may also have bends in the truncated areas which have sharp bends or may have rounded or softened edge corners at bends on either or both of the interior and exterior facing surfaces of the backer rings, depending on the desired seal design, and materials chosen within the scope of the invention.

Referring now to FIG. 6, there is shown an exploded longitudinal cross-sectional view of the fire-resistant seal assembly of FIG. 1. The first anti-extrusion seal 110 of the fire-resistant seal assembly 100 has a groove 118 defined by the first seal-facing surface 114. An angle ($\theta_1$) can be measured between the first leg 114a and second leg 114b of the first seal-facing surface 114 of the first anti-extrusion seal 110, with reference to intersection point 171 that is preferably from about 60 to about 120 degrees, and more preferably about 80 to about 100 degrees. Similarly, an angle ($\theta_2$) measured between the first and second legs 116a, 116b of the exterior surface 116 of the first anti-extrusion seal 110, with reference to intersection point 172 is preferably about 60 to about 120 degrees, and more preferably about 80 to about 100 degrees. In the first anti-extrusion seal 110, $\theta_1$ and $\theta_2$ may be the same or different.

Regarding the second anti-extrusion seal 120, an angle ($\theta_3$) can be measured between the first leg 124a and second leg 124b of the second seal-facing surface 124, with reference to the intersection point 173 that is preferably about 60 to about 120 degrees, and more preferably about 80 to about 100 degrees. Angle $\theta_2$ of the first anti-extrusion seal 110 may be the same as or different than $\theta_3$ formed by the second seal-facing surface 124 of the second anti-extrusion seal 120. When $\theta_2$ is equal to $\theta_3$, the first leg and second leg 116a, 116b of the exterior surface 116 of the first anti-extrusion seal 110 are in facing engagement with the first leg and second leg 124a, 124b of the second seal-facing surface 124, respectively. When $\theta_2$ is not equal to $\theta_3$, a larger cavity 129 is formed (as best shown in FIG. 5), providing additional space for deformation of the first anti-extrusion seal 110 upon exposure of the seal assembly to high temperatures or fire conditions.

An angle ($\theta_4$) measured between the first leg 126a and second leg 126b of the exterior surface 126 of the second anti-extrusion seal 120, with reference to the intersection point 174, may be about 60 to about 120 degrees, and more preferably about 80 to about 100 degrees. In the second anti-extrusion seal 120, $\theta_3$ and $\theta_4$ may be the same or different.

Each backer ring 130 includes an angle ($\theta_5$) measured between opposing legs 134a, 134b of the third seal-facing surface 134, with reference to intersection point 175. Angle $\theta_5$ is preferably about 60 to about 120 degrees, and more preferably about 80 to about 100 degrees. Angle $\theta_4$ of the second anti-extrusion seal 120 is preferably the same as or similar to $\theta_5$ so that a portion of the exterior surface 126 of the second anti-extrusion seal 120 contacts the seal-facing surface 134 of the backer ring 130. When $\theta_4$ is the same as $\theta_5$, the first leg 126a and second leg 126b of the exterior surface 126 of the second anti-extrusion seal 120 are in facing engagement with the first leg 134a and second leg 134b of the third seal-facing surface 134 of the backer ring 130, respectively. A cavity 139 may be formed between the exterior surface 126 and the third seal-facing surface 134 when the second anti-extrusion seal 120 does not completely fill the groove of the backer ring 130.

Further, each backer ring 130 has an angle ($\theta_6$) measured between the first leg 136a and second leg 136b of the exterior surface 136 with respect to an intersection point 176 that is preferably about 60 to about 120 degrees, and more preferably about 80 to about 100 degrees. Preferably, $\theta_5$ is the same as $\theta_6$ so that multiple backer rings can be stacked on each other in facing engagement, with minimal to no gap or cavity formed therebetween. No cavity is required between adjacent backer rings 130, 140 as the backer rings 130, 140 being composed of a rigid material do not deform significantly when exposed to high temperatures.

Figure 6A:
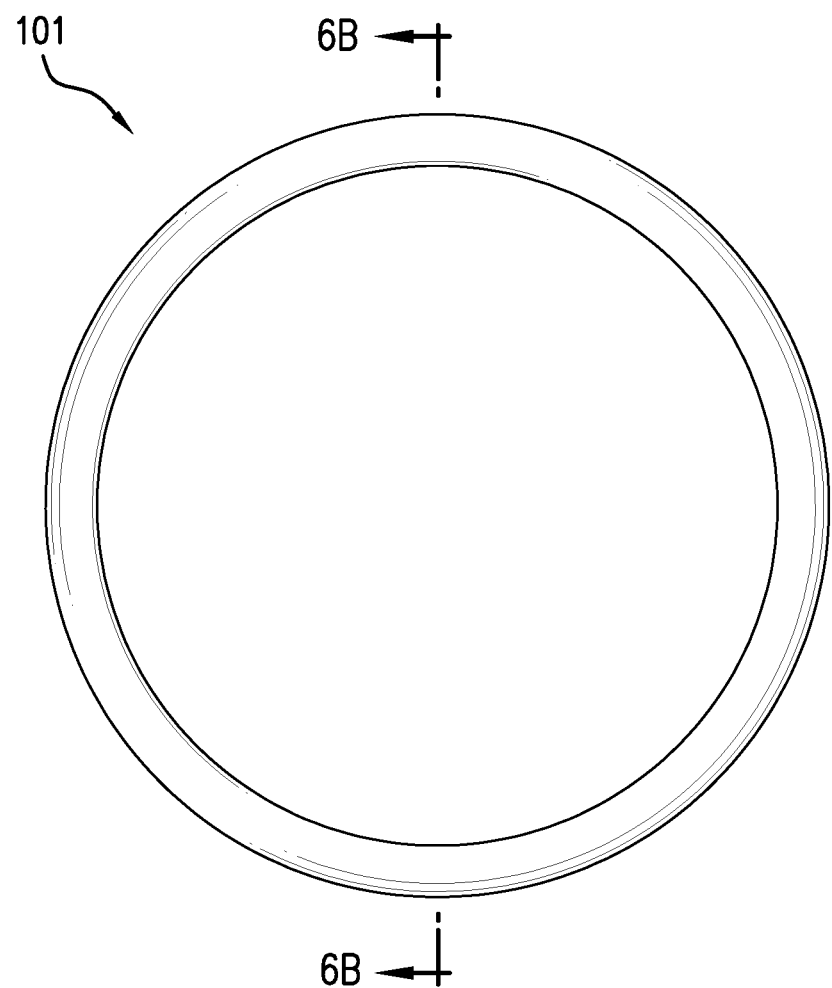
FIG. 6A is a top plan view of a first seal of the fire-resistant seal assembly of FIG. 1.
Figure 6B:
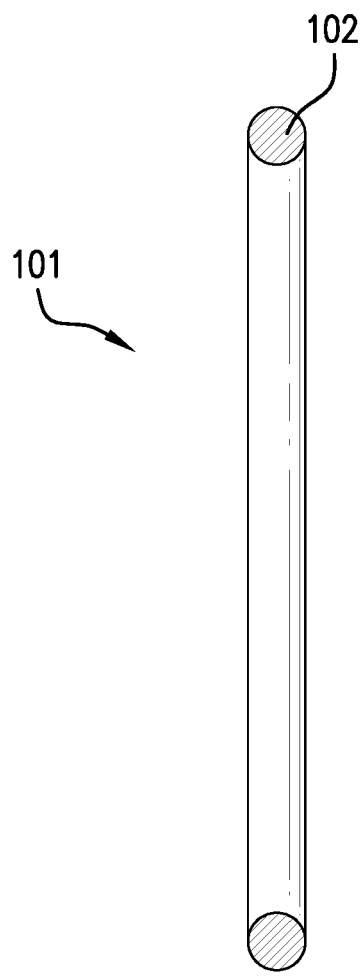
FIG. 6B is a longitudinal cross sectional view of FIG. 6A taken along line 6B-6B.
Figure 6C:
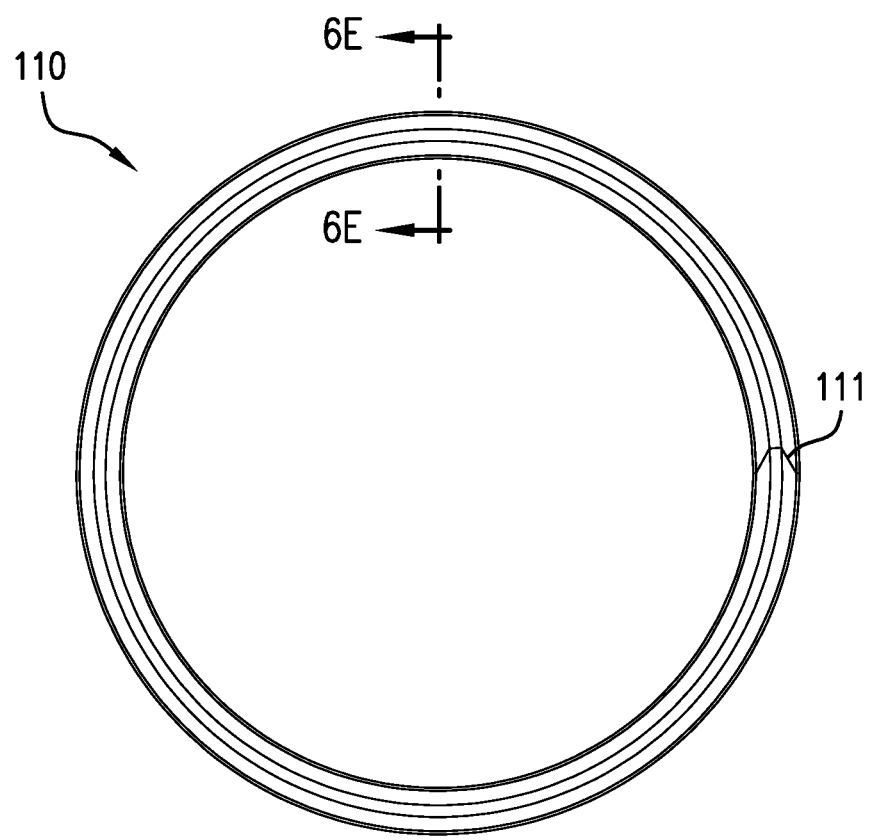
FIG. 6C is a top plan view of the first anti-extrusion seal of the fire-resistant seal assembly of FIG. 1.
Figure 6D:
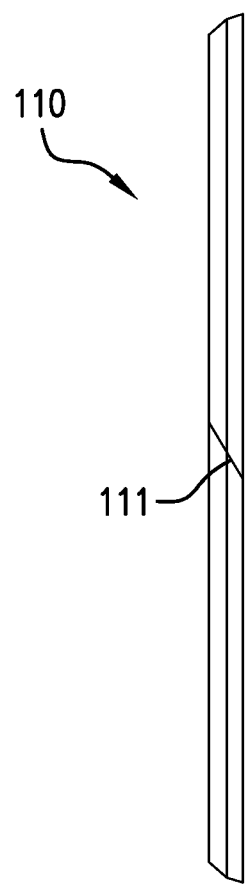
FIG. 6D is a side elevational view of the first anti-extrusion seal of FIG. 6C.
Figure 6E:
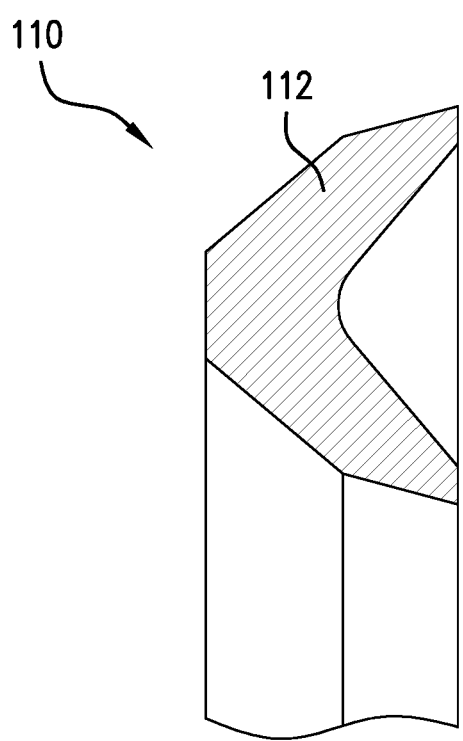
FIG. 6E is an enlarged partial longitudinal cross sectional view of the first anti-extrusion seal of FIG. 6C taken along line 6E-6E.
Figure 6F:
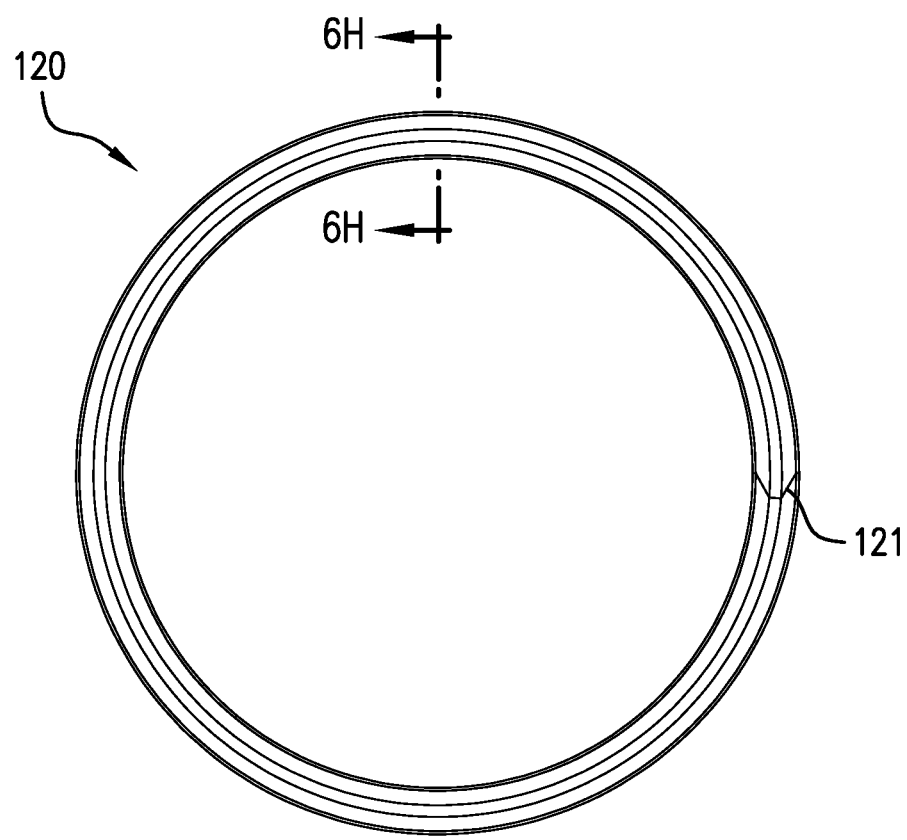
FIG. 6F is a top plan view of the second anti-extrusion seal of the fire-resistant seal assembly of FIG. 1.
Figure 6G:
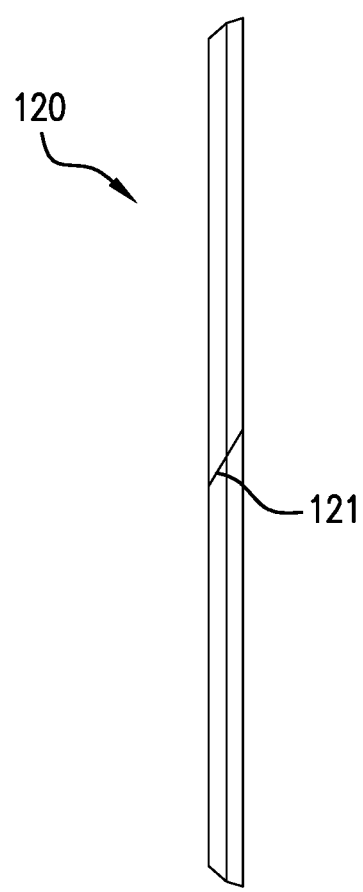
FIG. 6G is a side elevational view of the second anti-extrusion seal of FIG. 6F.
Figure 6H:
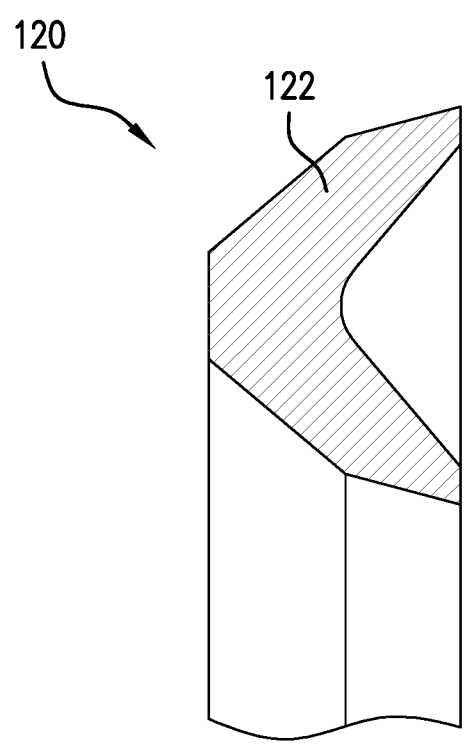
FIG. 6H is an enlarged partial cross sectional view of the second anti-extrusion seal of FIG. 6F taken along the line 6H-6H.
Figure 6I:
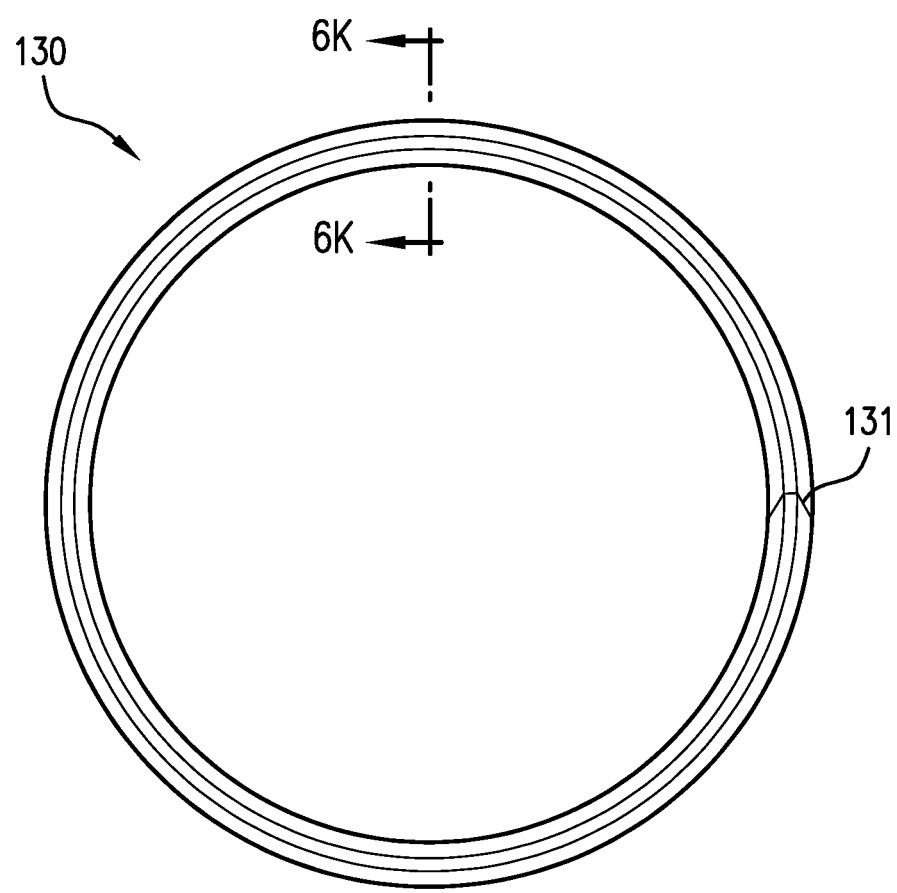
FIG. 6I is a top plan view of the first backer ring of the fire-resistant seal assembly of FIG. 1.
Figure 6J:
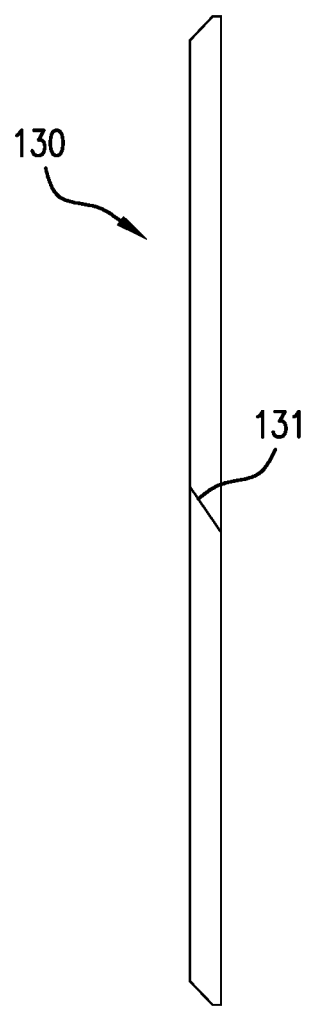
FIG. 6J is a side elevational view of the first backer ring of FIG. 6I.
Figure 6K:
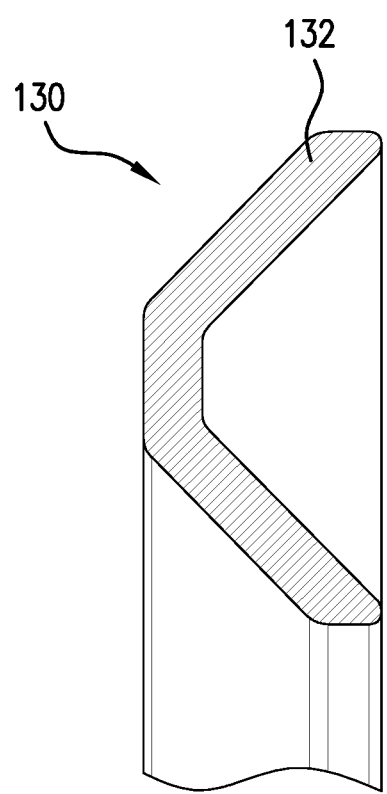
FIG. 6K is an enlarged partial longitudinal cross sectional view of the first backer ring of FIG. 6I taken along line 6K-6K.
Figure 6L:
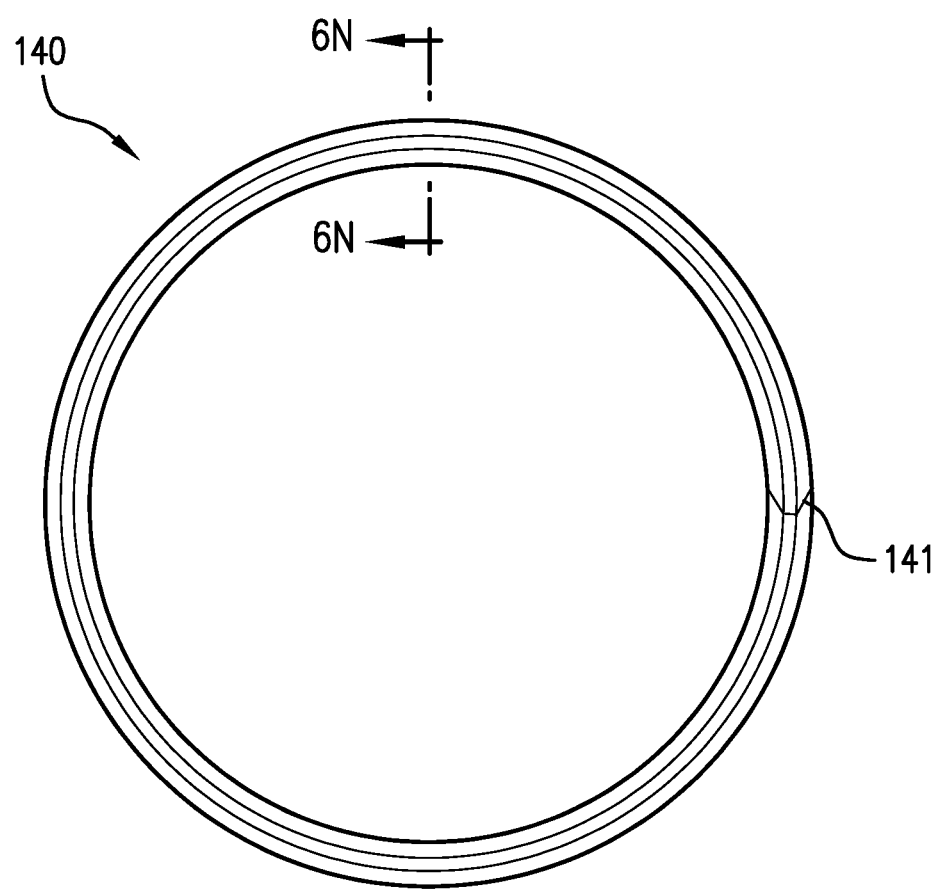
FIG. 6L is a top plan view of a second backer ring of the fire-resistant seal assembly of FIG. 1.
Figure 6M:
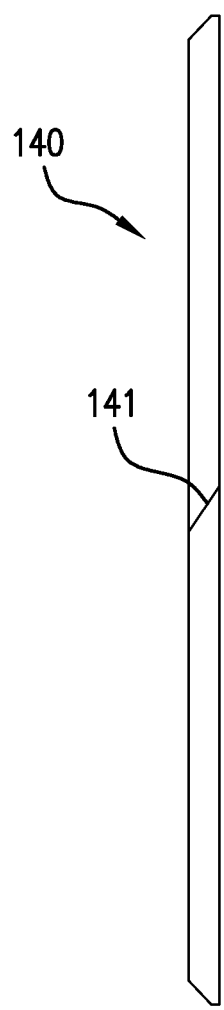
FIG. 6M is a side elevational view of the second backer ring of FIG. 6L.
Figure 6N:
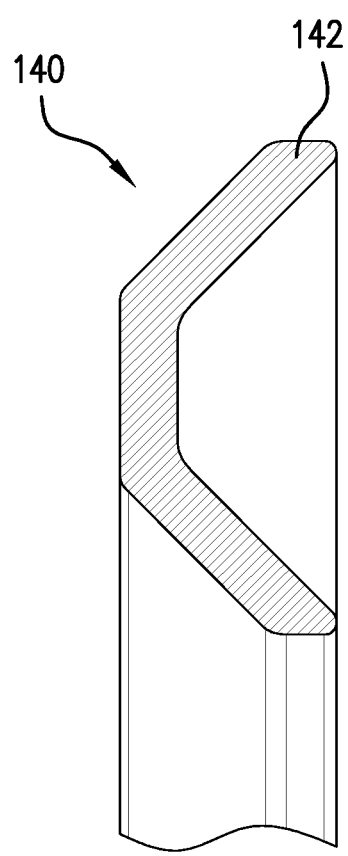
FIG. 6N is an enlarged partial longitudinal cross sectional view of the second backer ring of FIG. 6L taken along line 6N-6N.

Each component of the seal assembly of FIG. 1 is shown in further detail in FIGS. 6A-6N. The seal assembly 100 is not limited to the exact dimensions and/or proportions shown in the figures, and the figures are merely provided as examples of seals constructed in accordance with an embodiment of the present invention.

Figure 7A:
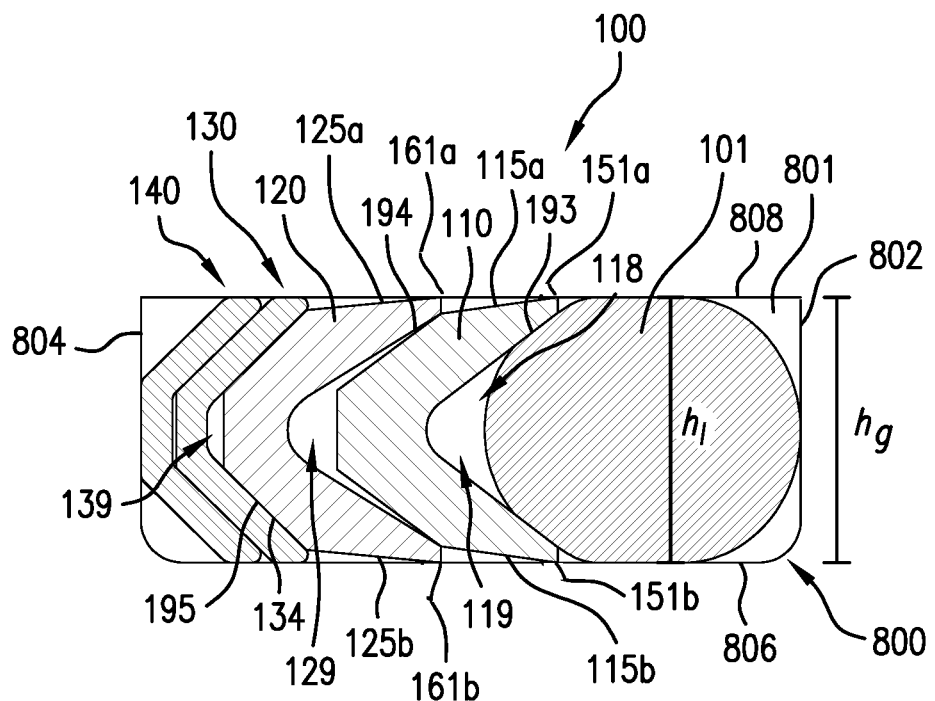
FIG. 7A is a longitudinal cross sectional view of the fire-resistant seal assembly of FIG. 1 positioned in a gland, prior to operation.
Figure 7B:
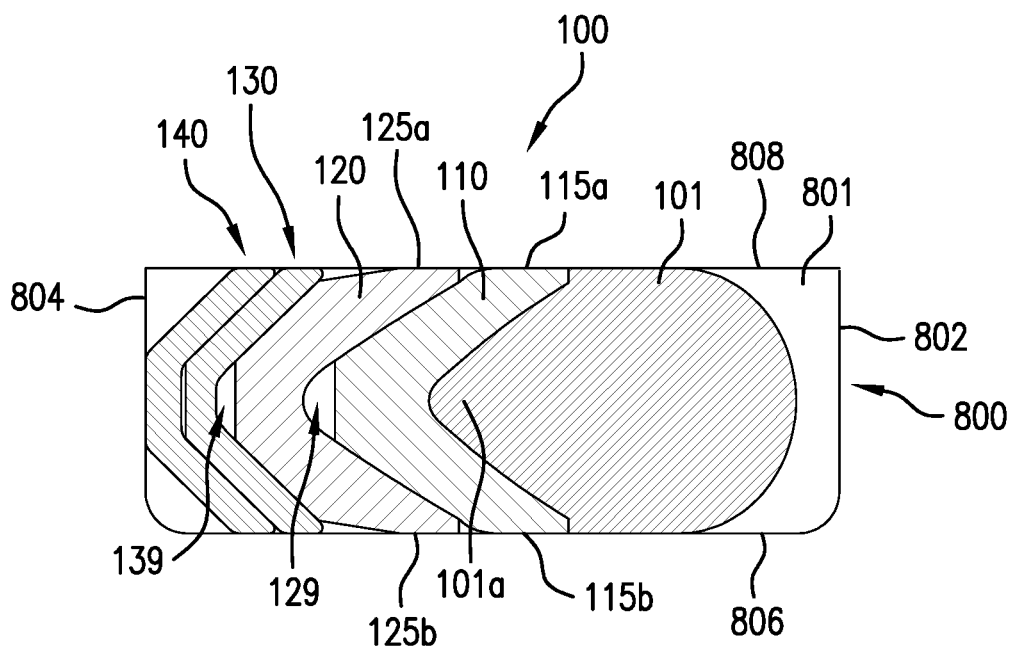
FIG. 7B is a longitudinal cross sectional view of the fire-resistant seal assembly of FIG. 7A positioned in a gland in operation.

Referring now to FIGS. 7A-7B, there are shown longitudinal cross-sectional views of the fire-resistant seal assembly of FIG. 1 as installed within a gland prior to operation and during operation, respectively. In the illustrated embodiment, the fire-resistant seal assembly 100 includes a first seal 101, a first anti-extrusion seal 110, a second anti-extrusion seal 120, and a pair of backer rings 130, 140. During installation, a fire-resistant seal assembly 100 of the present invention is placed within a gland 801 in a hydraulic component 800, such as a hydraulic actuator among other types of apparatuses, such as fluid handling components, wherein the gland 801 is formed between concentrically arranged surfaces 806, 808. The fire-resistant seal assembly 100 is installed such that the first seal 101 of the fire-resistant seal assembly 100 is positioned at the high-pressure side 802 of the hydraulic component 800, and the stack of anti-extrusion seals and backer ring(s) is arranged in a unidirectional configuration on the atmosphere/low-pressure side 804 of the hydraulic component 800. When installed within a gland 801 of a hydraulic component 800, the fire-resistant seal assembly 100 is configured to form a seal in order to prevent hydraulic fluid from the hydraulic component 800 from leaking therefrom, and further to maintain such a seal for a period of time under fire conditions. The seal assembly 100 has a height ($h_1$) measured in a radial direction that is at least the same as, and preferably somewhat greater than, the radial height of a gland ($h_g$) in which the seal assembly 100 is installed. In this way, the seal assembly 100 is under slight radial compression within the gland.

Once the seal assembly 100 is installed as shown in FIG. 7A, the first seal 101 contacts the opposing concentrically arranged surfaces 806, 808 to provide a seal. The first seal 101 is partially seated within the first anti-extrusion seal 110, such that a portion 193 of the first seal 101 is positioned within the groove of the first anti-extrusion seal 110 and contacts the first seal-facing surface 114. The first seal 101 does not completely fill the groove 118 of the first anti-extrusion seal 110, such that a cavity 119 is formed therebetween.

The beveled end portions 115a, 115b, and particularly the apex 151a, 151b of the first anti-extrusion seal 110 are in contact with the opposing concentrically arranged surfaces 806, 808 of the gland 801. The first anti-extrusion seal 110 is at least partially seated within the groove of the second anti-extrusion seal 120, such that a portion 194 of the exterior surface 116 of the first anti-extrusion seal 110 is in contact with the second seal-facing surface 124. The first anti-extrusion seal 110 does not completely fill the groove of the second anti-extrusion seal 120, such that a cavity 129 is formed therebetween.

The beveled end portions 125a, 125b, and particularly the apex 161a, 161b of the second anti-extrusion seal 120 are also in contact with the concentrically arranged surfaces 806, 808 of the gland 801. The second anti-extrusion seal 120 is at least partially seated within the first backer ring 130, such that a portion 195 of the exterior surface 126 of the second anti-extrusion seal 120 contacts the third seal-facing surface 134 of the backer ring 130. The two backer rings 130, 140 are in sealing engagement with the concentrically arranged surfaces 806, 808 of the gland 801. Further, the second of the two backer rings 140 is positioned so as to abut the atmosphere side 804 of the gland 801.

During operation of the hydraulic component 800, as shown in FIG. 7B, the first seal 101 is forced further into the groove. As the temperature increases, the first seal 101 may also deform and a deformed portion 101a of the first seal 101 may fill or partially fill the cavity 119. As the first seal 101 is forced into the cavity 119, the first anti-extrusion seal 110 expands radially so as to seal the gland 801, such that the beveled end portions 115a, 115b are in contact with the concentrically arranged surfaces 806, 808 of the gland 801 to a greater extent. Similarly, the pressure may force the first anti-extrusion seal 110 further into the groove of the second anti-extrusion seal 120, causing the second anti-extrusion seal 120 to radially expand, such that the beveled end portions 125a, 125b thereof contact the opposing concentrically arranged surfaces 806, 808 of the gland 801 to a greater extent, sealing the gland 801. The backer ring or rings 130, 140 being composed of a rigid material do not significantly shift or deform under pressure and at elevated temperatures. As the first seal 101 and/or anti-extrusion seals 110, 120 deform under heat and pressure, the backer rings 130, 140 help to maintain a seal and prevent the anti-extrusion seals 110, 120 from extruding out of the gland 801.

Figure 8:
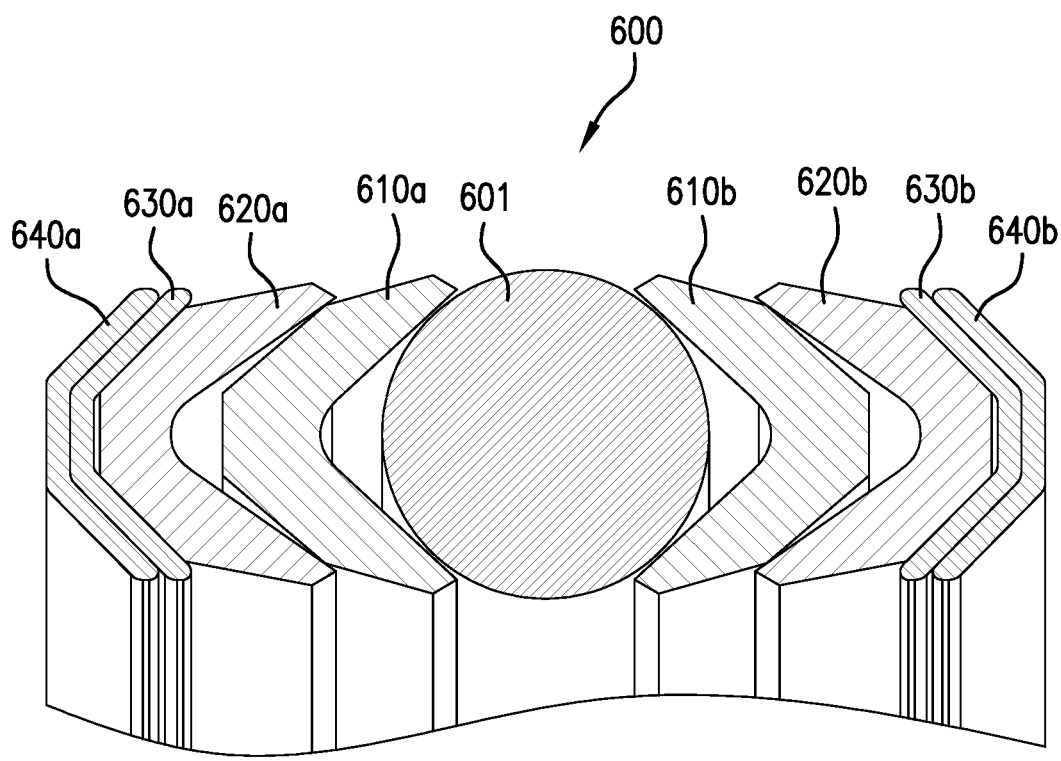
FIG. 8 is an alternative embodiment of the fire-resistant seal assembly of FIG. 1, having a bidirectional configuration.

Referring now to FIG. 8, there is shown a bidirectional embodiment 600 of the fire-resistant seal assembly. The bidirectional fire-resistant seal assembly 600 is constructed in the same manner as the embodiment of FIGS. 1-7B and differs only in its inclusion of an identical seal stack on the opposing side of the first seal 601 as the seal stack of FIGS. 1-7B. Thus, a first side of the first seal 601 includes a first anti-extrusion seal 610a, a second anti-extrusion seal 620a, and in the illustrated embodiment a first backer ring 630a and a second backer ring 640a. An opposing side of the first seal 601 includes a first anti-extrusion seal 610b, a second anti-extrusion seal 620b, and in the illustrated embodiment a first backer ring 630b and a second backer ring 640b. The anti-extrusion seals and backer rings may be constructed in the same manner and from the same materials as discussed above. The bidirectional fire-resistant seal assembly 600 is suited for use in dynamic sealing applications, and is particularly suited for use as a piston seal.

Figure 9:
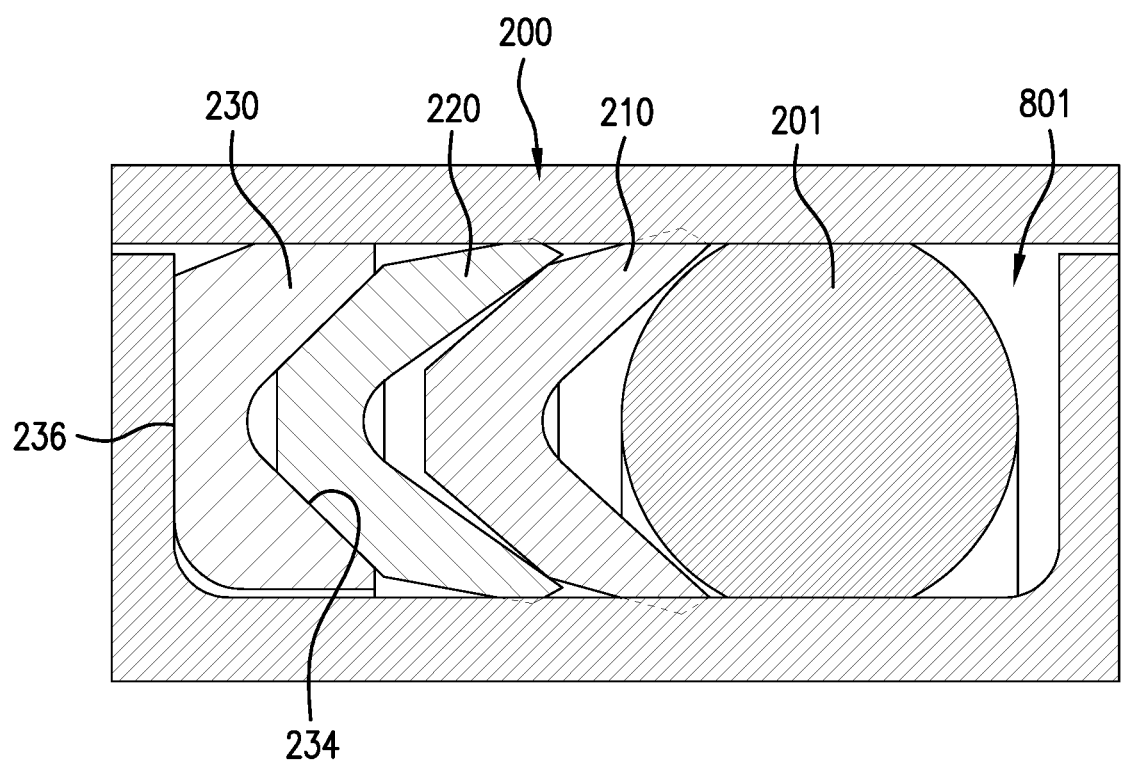
FIG. 9 is a longitudinal cross sectional view of a further alternative embodiment of a fire-resistant seal assembly having only a single backer ring according to the present invention.

Referring now to FIG. 9, there is shown an alternative embodiment of the fire-resistant seal assembly of the present invention. In the illustrated embodiment, the fire-resistant seal assembly 200 is substantially the same as the fire-resistant seal assembly 100 described above in FIGS. 1-7B, but includes only a single backer ring 230 which has an alternative construction than the construction described above for the backer ring(s) 130, 140. Thus, the seal assembly 200 includes a first seal 201, a first anti-extrusion seal 210, a second anti-extrusion seal 220 (although two or more such second anti-extrusion seals may be used if desired), and a single backer ring 230. The backer ring 230 includes a seal-facing surface 234 for receiving the second anti-extrusion seal 220, and an exterior surface 236. The seal-facing surface 234 defines a groove extending along the seal-facing surface 234. Preferably, the groove extends annularly around the seal-facing surface 234. The seal-facing surface 234 may be generally V-shaped in a longitudinal cross sectional view.

In a longitudinal cross sectional view, the exterior surface 236 of the backer ring 230 may have a truncated V-shaped portion and beveled end portions (not shown) so as to be shaped similarly to the exterior surface of the first and/or second anti-extrusion seals 210, 220. Alternatively, the exterior surface 236 of the backer ring 230 may have a substantially square or rectangular shape so as to fill a rectangular gland 801 in which the seal assembly 200 is positioned, as shown in FIG. 9.

The backer ring 230 in assembly 200 is preferably composed of a third polymeric material that is a thermoplastic or thermosetting polymeric material. Preferably, the third polymeric material has a higher decomposition temperature than both the first seal 201 and the first anti-extrusion seal 210. The third polymeric material may have the same decomposition temperature as the second anti-extrusion seal 220 shown and preferably has a higher decomposition temperature than the second anti-extrusion seal 220. In a preferred embodiment, the third polymeric material is a filled, reinforced and/or enhanced polyetheretherketone (PEEK), such as Arlon® 3000XT.

Figure 10:
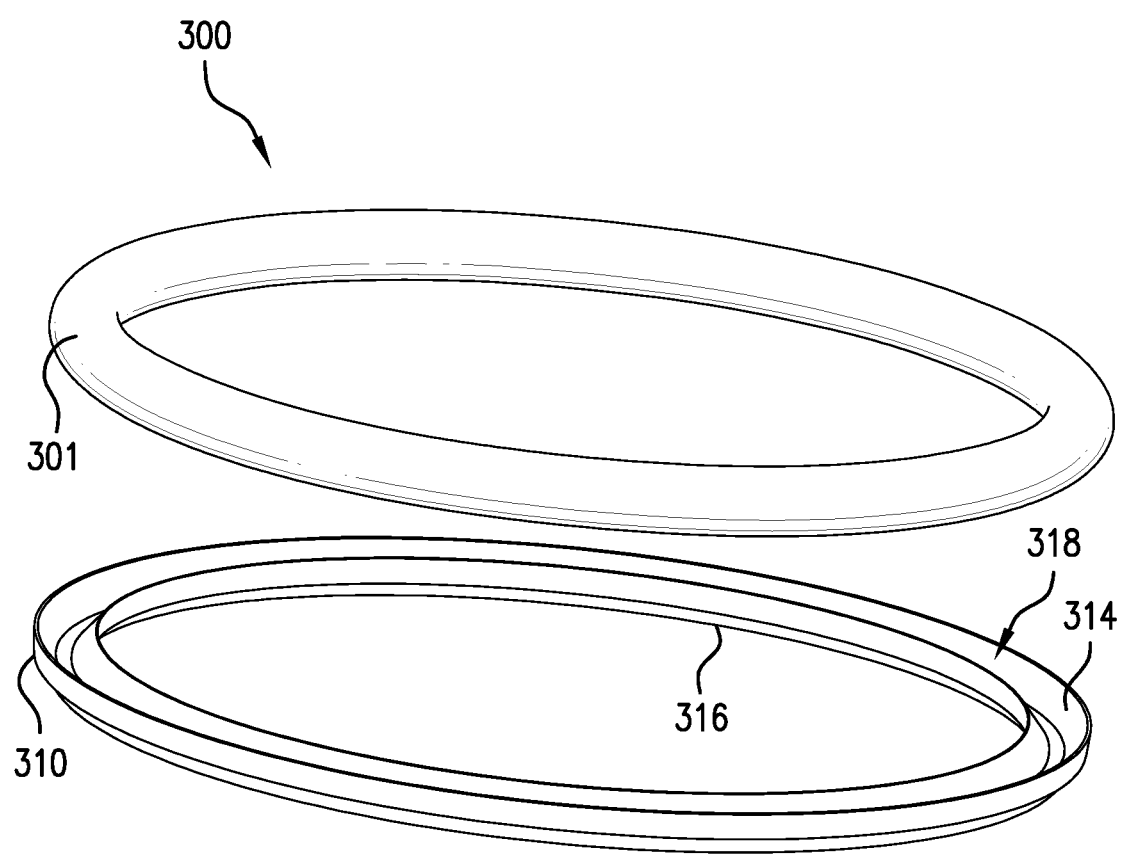
FIG. 10 is an exploded perspective view of a further alternative embodiment of a fire-resistant seal assembly having a single anti-extrusion seal according to the present invention.
Figure 11:
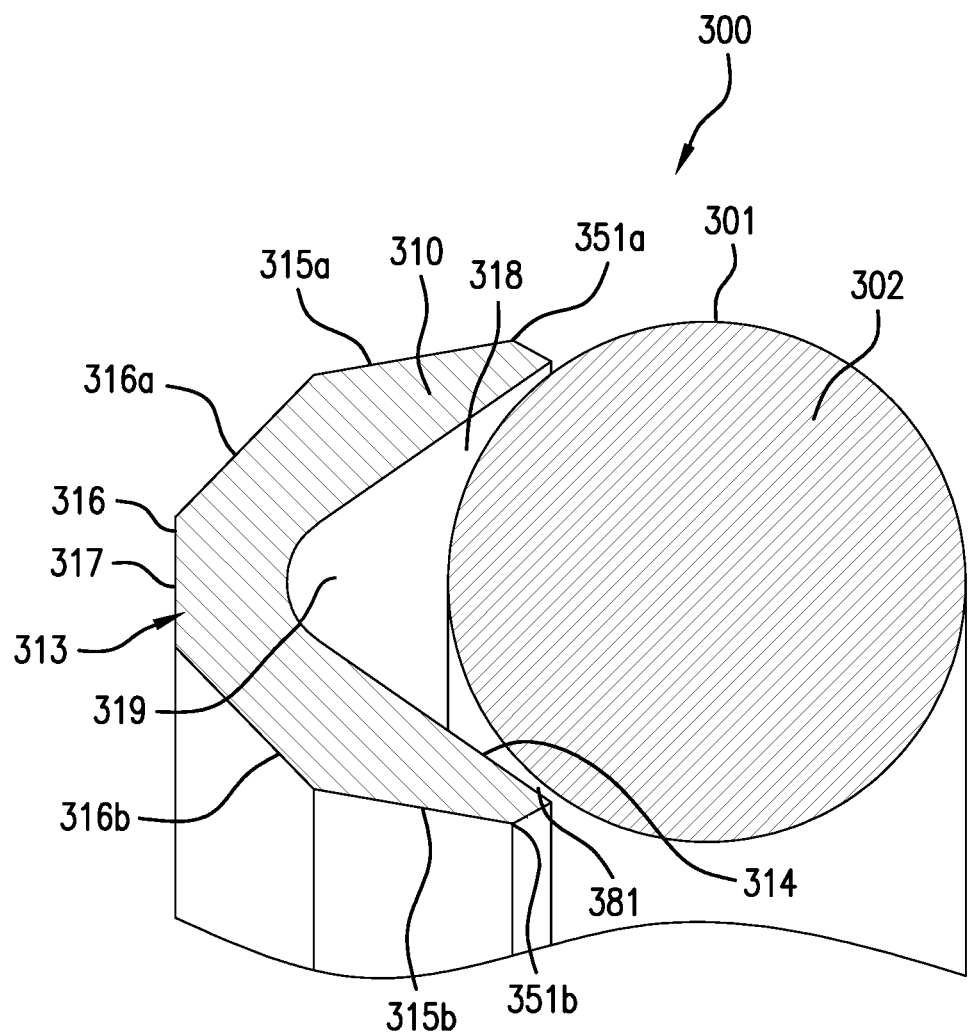
FIG. 11 is a longitudinal cross sectional view of the fire-resistant seal assembly of FIG. 10 when assembled.

Referring now to FIGS. 10 and 11, there is shown another alternative embodiment of a fire-resistant seal assembly of the present invention. The present invention further relates to a fire-resistant seal assembly 300 having a solid first seal 301 and a solid anti-extrusion seal 310. Thus, neither the first seal 301 nor the solid anti-extrusion seal 310 includes a cut, such as a scarf-cut, or the like. Split or cut rings are often used in order to facilitate installation of a seal or seal assembly on a component and also allow for simplified replacement of a damaged or worn seal. However, the cut or split may serve as a passageway for fluid to leak through the seal. The use of a solid anti-extrusion seal without such a cut or split eliminates this potential leakage pathway, providing enhanced sealing performance under fire conditions.

In the illustrated embodiment, the first seal 301 has a circular longitudinal cross section 302. However, in alternate embodiments, the first seal 301 may have other longitudinal cross sectional shapes, such as octagonal, heptagonal, hexagonal, elliptical, oval, or a truncated V-shape with beveled end portions, among other cross sectional shapes. The first seal 301 is preferably composed of an elastomeric material such as ethylene propylene diene rubber (EPDM) or other ethylene propylene (EPM) rubbers, nitrile rubber, silicone, fluorosilicone, fluoroelastomers, or perfluoroelastomers, among other suitable materials.

The solid anti-extrusion seal 310 has a seal-facing surface 314 for receiving the first seal 301, and an exterior surface 316. If desired, a second such solid anti-extrusion seal may be used, but in the preferred assembly shown, only one is employed. The seal-facing surface 314 defines a groove 318 that extends along the seal-facing surface 314. Preferably, the groove 318 extends annularly around the seal-facing surface 314. The seal-facing surface 314 is generally V-shaped in a longitudinal cross sectional view. Further, in a longitudinal cross sectional view, the exterior surface 316 has a truncated V-shaped portion 313 with beveled end portions 315a, 315b configured for sealing contact with a gland. The beveled end portions each include an apex 351a, 351b, the apex 351a, 351b being an outermost peak or point on the beveled end portion 315a, 315b in a radial direction, or can be a rounded or softer bend so long as sealing contact can be made. The truncated V-shaped portion 313 includes a first leg 316a and a second leg 316b separated by a truncated segment 317. The beveled end portions 315a, 315b extend from the truncated V-shaped portion 313 and taper towards the seal-facing surface 314.

The first seal 301 is positioned at least partially within the groove 318 of the solid anti-extrusion seal 310. At least a portion 381 of the first seal 301 is in contact with the seal-facing surface 314. The first seal 301 does not completely fill the groove 318 of the solid anti-extrusion seal 310, and a cavity 319 is formed between the solid anti-extrusion seal 310 and the first seal 301.

The solid anti-extrusion seal 310 is preferably composed of a thermoplastic or thermosetting polymeric material, such as polytetrafluoroethylene (PTFE), a polyphenylene sulfide (PPS), a polyethersulfone (PES), a polyimide (PI), or a polyaryletherketone (PAEK) such as polyetheretherketone (PEEK), polyetherketone (PEK), polyetherketonketone (PEKK), or polyetherketoneetherketonketone (PEKEKK), and copolymers, derivatives and combinations of these polymers individually or together, among other suitable thermoplastic or thermosetting polymeric materials. The polymeric material may be filled or reinforced, such as with carbon or glass particles or fibers. In a preferred embodiment, the polymeric material is a high modulus polymeric material, such as a filled or reinforced PEEK. In a preferred embodiment, the polymeric material is Arlon® 3000XT.

Figure 11A:
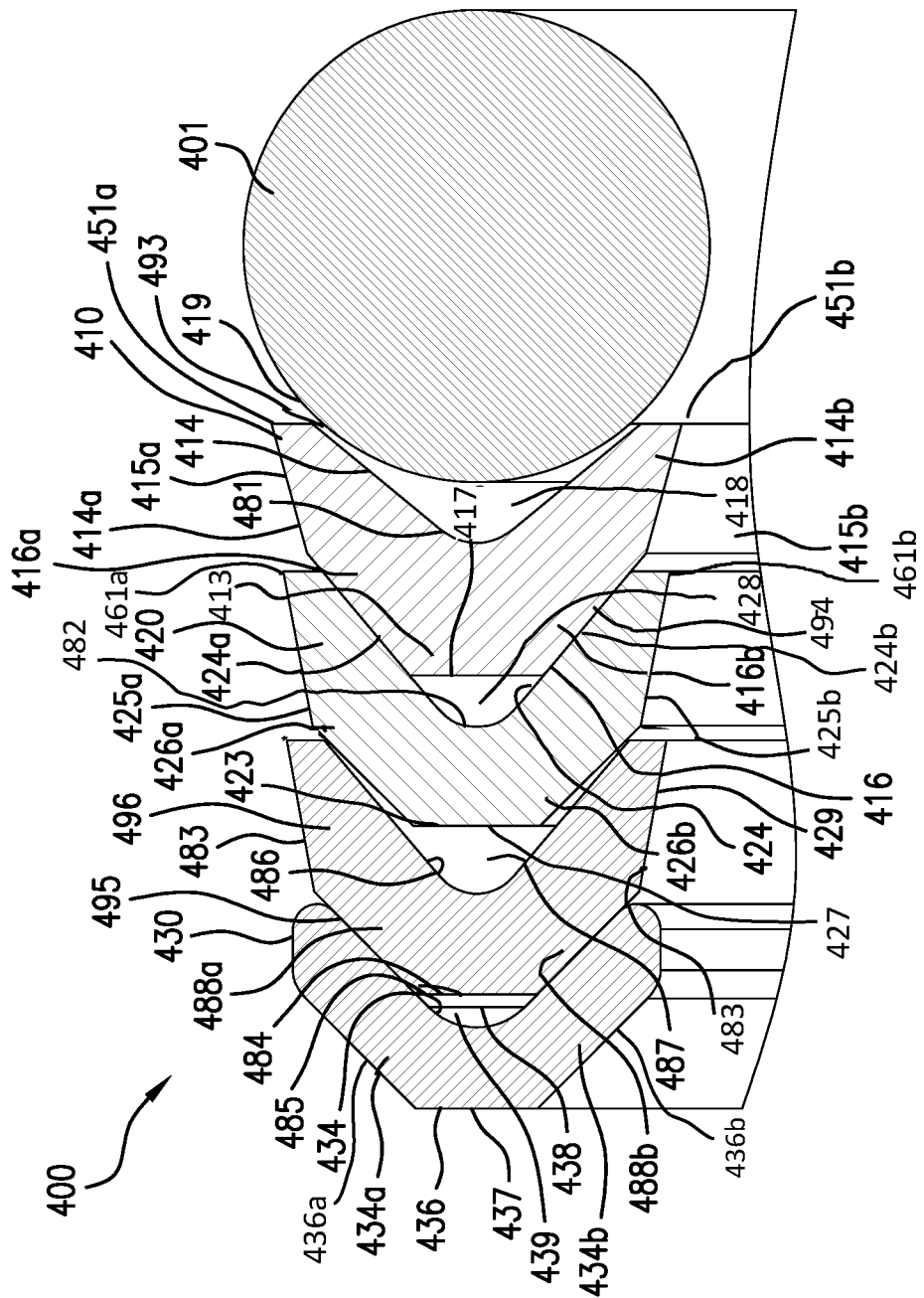
FIG. 11A is a longitudinal cross-sectional view of a further embodiment of a fire-resistant seal assembly according to the invention.

A further embodiment of a seal assembly according to the invention is shown in FIG. 11A having more than one second anti-extrusion seals. In this embodiment, shown generally as assembly 400, next to the first seal 401 (which may be the same as any of the first seals noted in embodiments above, but is preferably similar to that of embodiment 100), there are three anti-extrusion seals, the first anti-extrusion seal 410, and two second anti-extrusion seals 420 and 496. As shown in FIG. 11A, the general configuration of the first anti-extrusion seal 410 and each of the second anti-extrusion seals is similar to the first anti-extrusion seal 101, and second anti-extrusion seal 120 of embodiment 100. However, other configurations may be incorporated in this embodiment based on information in this disclosure. The backer ring is somewhat thicker than that of embodiment 100 and is formed as a single backer ring, but multiple backer rings may be used. As shown, the backer ring is thicker and beveled and may be formed of either any of the polymeric materials noted above or may be metal backer ring(s). Preferably the backer ring 430 in the embodiment shown is formed of one of the second polymeric or third polymeric materials noted above with respect to embodiments 100 and 200.

In FIG. 11A, as with other embodiments, like reference numeral indicate similar or analogous parts.

The first seal 401 as shown is preferably annular in configuration as shown and similar to the seal of the embodiments described above, wherein the cross-sectional configuration may be varied if desired. The first seal 401 is preferably formed from elastomeric material as described above consistent with materials as noted in prior embodiments and may be split or solid.

The elastomeric material of the first seal 401 is selected to provide a seal and prevent leakage at ordinary operating temperatures and pressures, and like embodiment 100, is not intended to contribute significantly to the fire-resistant properties of the seal assembly 400.

As shown in FIG. 11A, the first anti-extrusion seal 410 has an exterior surface 416, and a first seal-facing surface 414 for receiving the first seal 401. The first seal-facing surface 414 defines a groove 418 that extends along the first seal-facing surface 414. The groove 418 preferably extends annularly around the first seal-facing surface 414. In some embodiments, the first seal-facing surface 414 is generally V-shaped in a longitudinal cross sectional view, and includes a first leg 414a and a second leg 414b that intersect at a point or that are connected by a radiused bend 481. The first seal 401 is received by the first seal-facing surface 414 such that the first seal 401 contacts at least a portion 493 of the first seal-facing surface 414. It will be understood by those skilled in the art that a similar contact portion to portion 493 would preferably also be found on the lower leg 414b of the seal and that multiple contact portions could be formed depending on the design of the seal. At least a portion of the first seal 401 is positioned within the groove 418, and the first seal 401 is configured to form a seal with the gland in which the seal assembly 400 is positioned as demonstrated with respect to embodiment 100. The degree to which the first seal 401 is positioned within the groove 418 and the points of contact may be varied somewhat depending on the specific configurations chosen for the first seal 401 and the first anti-extrusion seal 410 in variations of the embodiment herein within the scope of the invention.

In a longitudinal cross-sectional view of FIG. 11A, the exterior surface 416 of the first anti-extrusion seal 410 has a truncated V-shaped portion 413 and beveled end portions 415a, 415b. The truncated V-shaped portion 413 includes a first leg 416a and a second leg 416b separated by a truncated segment 417. The beveled end portions 415a, 415b extend from the truncated V-shaped portion 413 and taper towards the first seal-facing surface 414. The beveled end portions 415a, 415b are configured for sealing contact with a gland in which the seal assembly 100 is positioned. The beveled end portions 415a, 415b may each form an apex 451a, 451b for sealing contact with the gland, the apex 451a, 451b being an outermost peak or point on the beveled end portion 415a, 415b in a radial direction, or can be a rounded or softer bend so long as sealing contact can be made consistent with and similar to the embodiment 100 herein. Contact may be made with the gland at least at the apex points and/or a portion of the bevel depending on the seal design used herein.

A first of two second anti-extrusion seals, second anti-extrusion seal 420, is shown in embodiment 400 as well. The second anti-extrusion seal 420 has an exterior surface 426, and a second seal-facing surface 424 for receiving the first anti-extrusion seal 410. The second seal-facing surface 424 defines a groove 428 extending along the second seal-facing surface 424. The groove 428 preferably extends annularly around the second seal-facing surface 424. In some embodiments, the second seal-facing surface 424 is generally V-shaped in a longitudinal cross-sectional view. The second seal-facing surface 424 preferably includes a first leg 424a and a second leg 424b which may intersect at a point, or may be connected by a rounded or radiused bend 482.

The exterior surface 416 of the first anti-extrusion seal 410 is positioned at least partially within the groove 428 of the second anti-extrusion seal 420, such that a portion(s) 494 of the exterior surface 416 of the first anti-extrusion seal 410 contacts the second seal-facing surface 424 of the second anti-extrusion seal 420. As noted above, more than one point or portion of contact may be present. The first leg 416a and second leg 416b of the exterior surface 416 of the first anti-extrusion seal 410 may be configured so as to be in facing engagement with the first leg 424a and second leg 424b of the second seal-facing surface 424 of the second anti-extrusion seal 420, respectively. When the first anti-extrusion seal 410 is positioned at least partially within the groove 428, the beveled end portions 415a, 415b extend outwardly from the groove 428 of the second anti-extrusion seal 420 and are configured for sealing contact with the walls of a gland in which the seal assembly 100 is positioned.

In a longitudinal cross-sectional view, the exterior surface 426 of the second anti-extrusion seal 420 has a truncated V-shaped portion 423 and also has beveled end portions 425a, 425b. The truncated V-shaped portion 423 includes a first leg 426a and a second leg 426b separated by a truncated segment 427. The beveled end portions 425a, 425b extend from the truncated V-shaped portion 423 and taper towards the second seal-facing surface 424. The beveled end portions 425a, 425b are configured for sealing contact with a gland in which the seal assembly 400 is positioned. The beveled end portions 425a, 425b may further include an apex 461a, 461b configured for sealing contact with a gland, the apex 461a, 461b being an outermost peak or point on the beveled end portion 425a, 425b in a radial direction, or can be a rounded or softer bend so long as sealing contact can be made. Contact with the gland may occur at the apex and/or some portion of the beveled end portions depending on the seal configuration.

The first anti-extrusion seal 410 is preferably formed from a first polymeric material that has a higher decomposition temperature than a decomposition temperature of the elastomeric material of the first seal 401 in the same manner and using the same materials as noted above for seal 101 in embodiment 100.

The second anti-extrusion seal 420 may be formed from the same polymeric material as the first anti-extrusion seal 410 to provide redundant sealing. However, the second anti-extrusion seal 420 is preferably composed of a second polymeric material that has a higher decomposition temperature than the first polymeric material used to form the first anti-extrusion seal 410 in the same manner as the first anti-extrusion seal 110 and the second anti-extrusion seal 120 in embodiment 100.

As shown, a further, second anti-extrusion seal, 496, (which is a third-anti-extrusion seal) is provided in tandem assembly with the second anti-extrusion seal 420. It is noted that a third, anti-extrusion seal may be situated as shown or in a reversed position of seal 420. The seal 496 as shown as the same configuration and shape as the second anti-extrusion seal 420 and sits in a mating fashion with respect to the second anti-extrusion seal 420. The two second-anti-extrusion seals 420, 496, may be configured to somewhat different also within the scope of the invention or to be of the same configuration as shown. They may also meet so that when placed within a gland they are in facing engagement or may have a gap, so long as sealing occurs with the gland in the manner shown, e.g., in FIGS. 7A and 7B with respect to embodiment 100. The exterior surface 484 of the anti-extrusion seal 496 has a bevel 483 and a truncated portion 485 in the same manner as anti-extrusion seal 420. The seal-facing surface 486 of the seal 496 forms a groove 487 that receives the exterior surface 426 of the innermost second anti-extrusion seal 420.

The fire-resistant seal assembly 400 further includes at least one backer ring 430. In the embodiment shown, only one backer ring is provided, but two may be used as noted above. The backer ring 430 has a third seal-facing surface 434 for receiving the exteriorly positioned, second anti-extrusion seal 496, and an exterior surface 436. The third seal-facing surface 434 defines a groove 438 that extends along the third seal-facing surface 434. Preferably, the groove 438 extends annularly around the third seal-facing surface 434. The third seal-facing surface 434 may have a truncated V-shape in a longitudinal cross-sectional view, but preferably is rounded as shown. The exterior surface 436 of the backer ring 430 when viewed in a longitudinal cross-sectional view, has a truncated V-shape. The truncated V-shape of the exterior surface 436 includes a first leg 436a and a second leg 436b separated by a truncated segment 437. The exterior surface 484 of the outermost, second anti-extrusion seal 496 is positioned at least partially within the groove 438 of the backer ring 430, such that at least a portion 495 of the exterior surface 484 contacts the third seal-facing surface 434 of the backer ring 430. The first leg 488a of the outermost second anti-extrusion seal 496 may be in facing engagement with the first leg 434a of the third seal-facing surface 434 and the second leg 488b may similarly be in facing engagement with the second leg 434b of the third seal-facing surface. When the outermost second anti-extrusion seal 496 is positioned at least partially within the groove 438 of a backer ring 430, the beveled end portions 483 on the top and bottom of extrusion seal 496 extend outwardly from the groove 438 and are configured to contact the opposing walls of the gland to form a seal.

The backer ring 430 of the fire-resistant seal assembly of the present invention may be formed using a rigid material, having a greater rigidity than either of the first or second polymeric materials used to form the first anti-extrusion seal 410 and second anti-extrusion seals 420, 496, respectively. The backer ring may be metallic or, more preferably formed of a third polymeric material as noted above. In this way, the backer ring or rings if more than one is used can support the first anti-extrusion seal and the second anti-extrusion seals. The "rigidity" of the materials may be as noted above in any of the above embodiments.

The backer ring may also have bends in the truncated areas which have sharp bends or may have rounded or softened edge corners at bends on either or both of the interior and exterior facing surfaces of the backer rings as shown in FIG. 11A, depending on the desired seal design, and materials chosen within the scope of the invention. Further the angles of truncation or bending may be similar to those noted above for embodiments 100 and 200.

The present invention also relates to methods for improving fire-resistance in a hydraulic component. Preferably, the component is a hydraulic component that is located in a fire zone, such as a fire zone of an aircraft engine. The hydraulic component can be any of various hydraulic components, including a hydraulic actuator. A fire-resistant seal assembly of the present invention is installed within a gland of the hydraulic component, such that the fire-resistant seal assembly prevents the leakage of fluid from the hydraulic component during normal operating conditions as well as during fire conditions.

Additionally, the present invention relates to fire-resistant hydraulic components. The hydraulic components may be any of various hydraulic components known in the art, particularly those for use in fire zones of aircraft engines, such as hydraulic actuators, that further include a fire-resistant seal assembly of the present invention as described herein. The fire-resistant seal assembly helps to prevent hydraulic fluid from leaking out of the hydraulic component at a range of temperatures, including under fire conditions.

The present invention will now be further described with respect to the following non-limiting examples:

EXAMPLE 1

Figure 12:
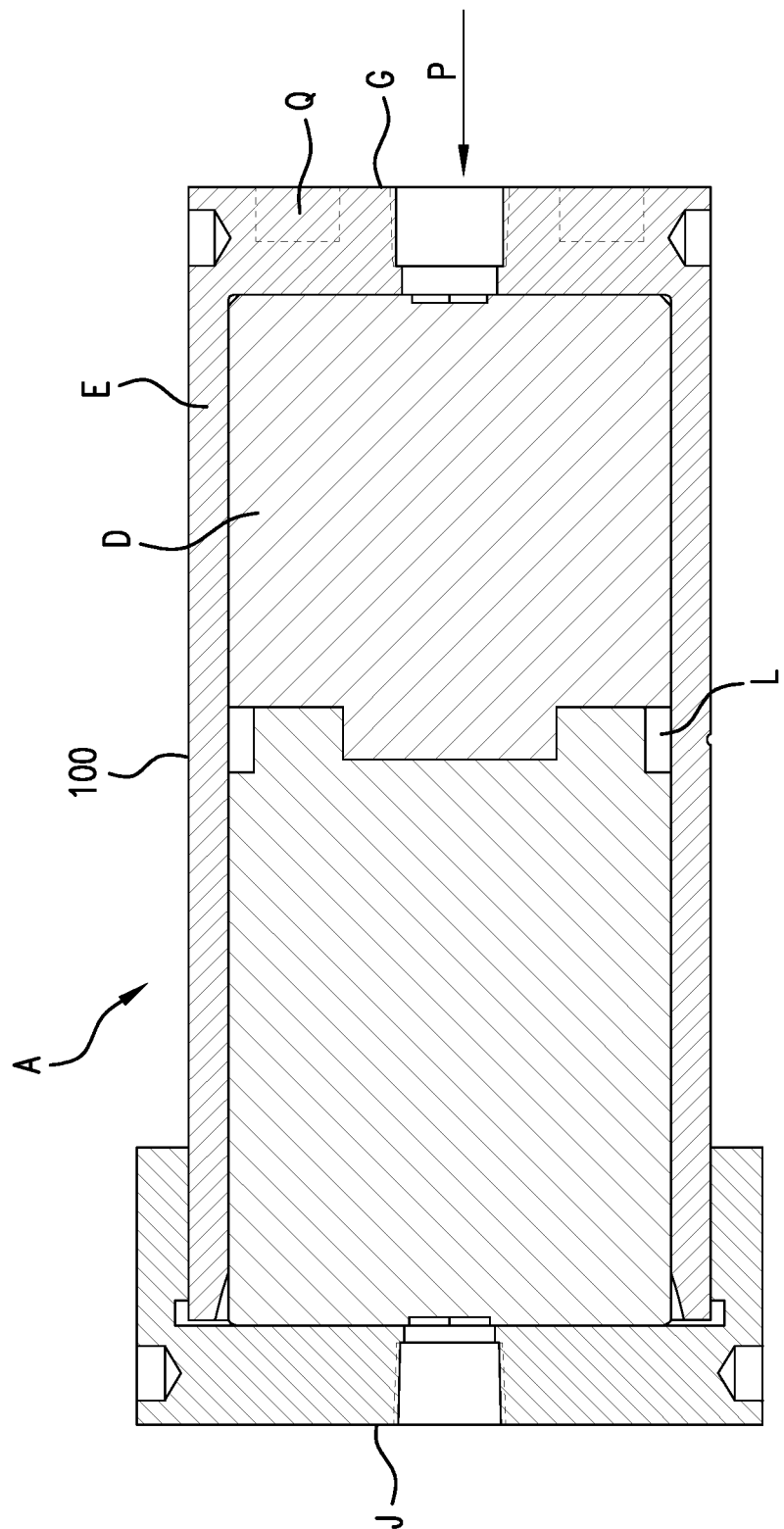
FIG. 12 is a longitudinal cross sectional view of an experimental apparatus for testing the performance of various sample seal assemblies under fire conditions.
Figure 13:
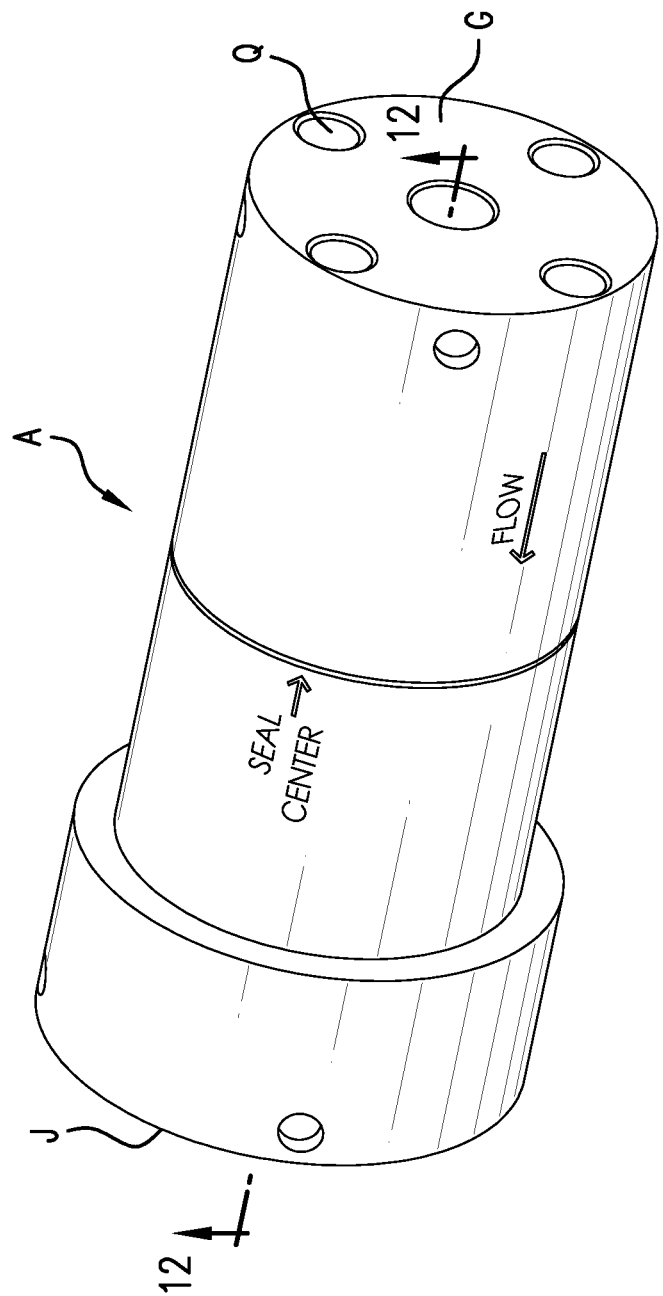
FIG. 13 is a perspective view of the experimental apparatus of FIG. 12.
Figure 14:
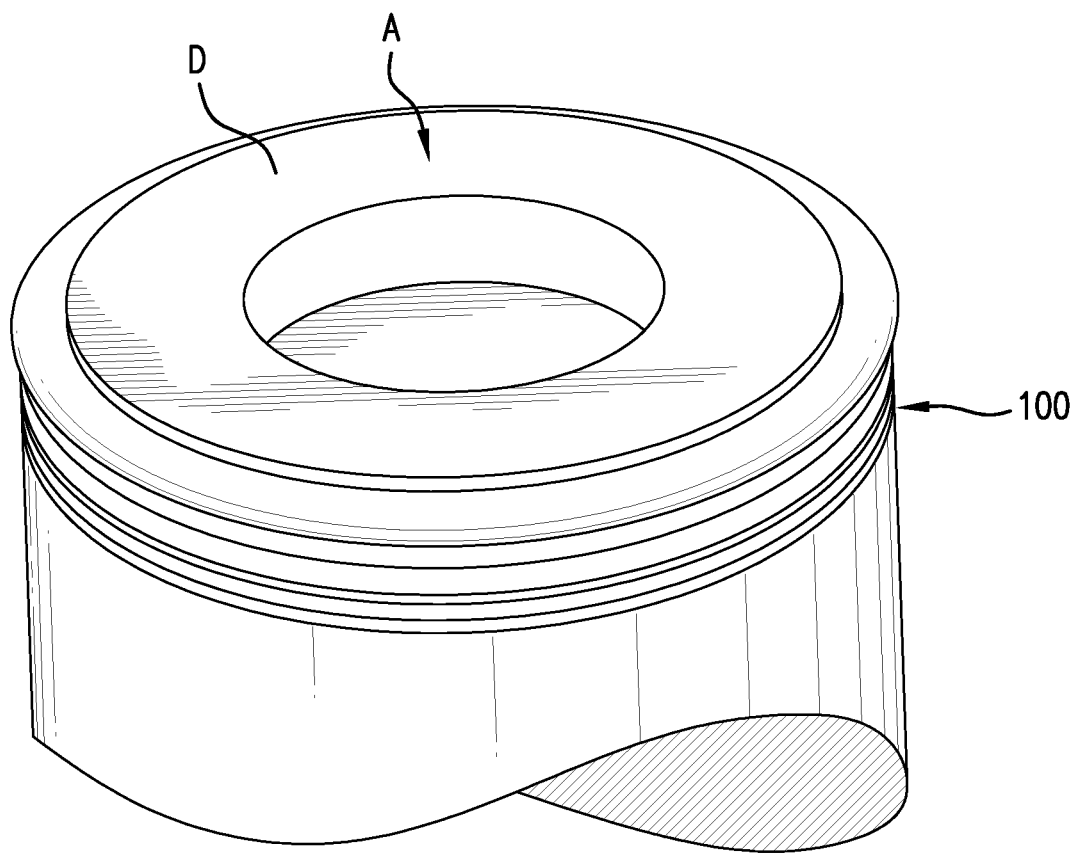
FIG. 14 is a perspective view of the cylindrical component of the experimental set-up of FIG. 12 around the exterior of which a sample seal assembly is positioned for testing.
Figure 15:
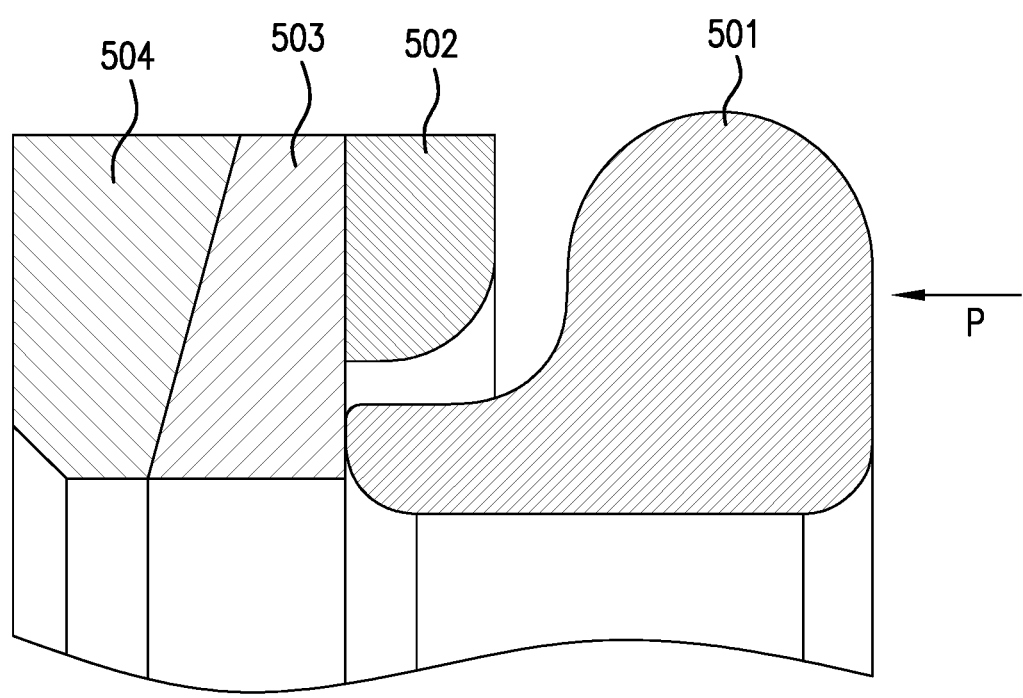
FIG. 15 is a longitudinal cross sectional view of a prior art seal assembly as used in Comparative Sample 1 in Example 2.

Sample seal assemblies were tested in order to develop a seal assembly having improved fire-resistance relative to conventional fire-resistant seal designs. Various sample seal assemblies were prepared and tested under test conditions similar to those set forth in RTCA/DO-160G and ISO 2685. Each sample seal assembly included a first seal composed of 954 EPDM (supplied by Greene, Tweed) and one or more additional seals formed from various materials. Each sample seal assembly had an inner diameter of about 1.859 inches. Once the sample seal assemblies were prepared, the sample seal assemblies were positioned in a gland L formed between concentric cylindrical components D of a test apparatus A, as shown in FIGS. 12-14. Nitrogen gas was supplied on a first side G of the test apparatus A to simulate the performance of the sample seal assemblies at operating pressure, and the opposing side J of the apparatus A was at atmospheric pressure. With a sample seal assembly installed in the gland L, the test apparatus A was exposed to heat from a flame produced by a propane torch, wherein the flame was applied directly to the front of the gland housing for 15 minutes or until the sample seal assembly failed. The maximum internal temperature of the test apparatus at failure of the seal assembly was determined by thermocouples Q positioned within the test apparatus and adjacent to the seal assembly.

EXAMPLE 2

Table 1 shows the components of the sample seal assemblies prepared for testing. The configuration of each sample seal assembly is shown at FIGS. 15-19 and 22 and 23 to 26.

TABLE 1

| Sample Name | Comparative Sample 1 | Comparative Sample 2 | Inventive Sample 1 | Inventive Sample 2 | Inventive Sample 3 | Inventive Sample 4 | Inventive Sample 5 | Inventive Sample 6 |
| --- | --- | --- | --- | --- | --- | --- | --- | --- |
| First seal | 954 EPDM | 954 EPDM | 954 EPDM | 954 EPDM | 954 EPDM | 954 EPDM | 954 EPDM | 954 EPDM |
| First anti-extrusion seal | Arlon 3000XT | Arlon 1263 | Avalon 89 | Avalon 89 | Avalon 89 | Avalon 89 | Avalon 89 | Avalon 89 |
| Second anti-extrusion seal | Arlon 3000XT | — | Arlon 1263 | Arlon 1263 | Arlon 1263 | Arlon 1263 | Arlon 1263 | Arlon 1263 |
| Third anti-extrusion seal | Arlon 3000XT | — | — | — | — | — | — | — |
| First backer ring | — | Al-Ni-Br | Al-Ni-Br (0.015 inch thickness) | Al-Ni-Br (0.015 inch thickness) | C260 brass | Al-Ni-Br (0.015 inch thickness) | Al-Ni-Br (0.01 inch thickness) | Al-Ni-Br (0.01 inch thickness) |
| Second backer ring | — | Al-Ni-Br | Al-Ni-Br (0.015 inch thickness) | — | C260 brass | Al-Ni-Br (0.015 inch thickness) | Al-Ni-Br (0.01 inch thickness) | Al-Ni-Br (0.01 inch thickness) |
| Maximum internal temperature at failure (° F.) | 650 | 1300 | 1312 | 1075 | 1175 | 1366 | 1197 | 1180 |
| Time until failure (min) | 1 | 11 | 10 | 6 | 12 | 14 | 11 | 10 |
| Leakage of 1 mL/min detected prior to failure? (Y/N) | N | Y | N | N | N | N | N | N |

TABLE 1-continued

| Sample Name | Inventive Sample 9* | Inventive Sample 10* | Inventive Sample 11* | Inventive Sample 12 | Inventive Sample 13 | Inventive Sample 14 | Inventive Sample 15 | Inventive Sample 16 |
|---|---|---|---|---|---|---|---|---|
| First seal | 954 EPDM | 954 EPDM | 954 EPDM | 954 EPDM | 954 EPDM | 954 EPDM | 954 EPDM | 954 EPDM |
| First anti-extrusion seal | Arlon 89 | Arlon 1263 | Avalon 89 | Avalon 89 | Avalon 89 | Avalon 89 | Avalon 89 | Avalon 89 |
| Second anti-extrusion seal | Arlon 3000XT | Arlon 300XT | Arlon 1263 | Arlon 1263 | Arlon 1263 | Arlon 1263 | Arlon 1263 | Arlon 1263 |
| Third anti-extrusion seal | — | — | — | — | — | — | — | — |
| First backer ring | Arlon 300XT | Al-Ni-Br | C260 Brass | Al-Ni-Br (0.01 inch thickness) | Al-Ni-Br (0.015inch Thickness) | Al-Ni-Br (0.015 inch thickness) | Al-Ni-Br (0.015 inch thickness) | Al-Ni-Br (0.01 inch thickness) |
| Second backer ring | — | Al-Ni-Br | C260 Brass | Al-Ni-Br (0.01 Inch thickness) | — | Al-Ni-Br (0.015 inch thickness) | Al-Ni-Br (0.015 inch thickness) | Al-Ni-Br (0.01 inch thickness) |
| Maximum internal temperature at failure (° F.) | 1050 | 1260 | 1050 | 1164 | 1266 | 1124 | 1264 | 1145 |
| Time until failure (min) | 18 | 11 | 23 | 12 | 11.4 | 12.3 | 8 | 7 min. 45 s |
| Leakage of 1 mL/min detected prior to failure? (Y/N) | N | N | N | N | N | N | N | N |

| Sample Name | Inventive Sample 17 | Inventive Sample 18 | Inventive Sample 19 |
|---|---|---|---|
| First seal | 954 EPDM | 954 EPDM | 954 EPDM |
| First anti-extrusion seal | Arlon 89 | Avalon 89 | Avalon 89 |
| Second anti-extrusion seal | Arlon 1263 | Arlon 1263 | Arlon 1263 |
| Third anti-extrusion seal | — | — | — |
| First backer ring | Al-Ni-Br (0.015 inch Thickness) | Al-Ni-Br (0.015 inch Thickness) | Al-Ni-Br (0.015 inch. Thickness) |
| Second backer ring | Al-Ni-Br (0.015 Inch Thickness) | Al-Ni-Br (0.015 inch thickness) | Al-Ni-Br (0.015 inch. Thickness) |
| Maximum internal temperature at failure (° F.) | — | 1406 | 1050 |
| Time until failure (min) | 15 (fixed-not to failure) | 15 (fixed-not to failure) | 15 (fixed-not to failure) |
| Leakage of 1 mL/min detected prior to failure? (Y/N) | Y** | N*** | N |

*Sample seal assemblies and time/temperature at failure when tested using a flame temperature of approximately 2000° F. unless otherwise noted
*Testing at 1400°-1800° F.
**Fixture is vertical during testing, column of phosphate ester fluid (Skydrol) on seal but not pressurized; smoking seen during testing; post-test pressurization to 70 psi yielded very slow leak, but seal had for some time.
***no leakage at 15 min. During test at 8 min, smoke from bottom. Post Test-fixture maintained 25 psi over two days, then increased pressure to 75 psi and set for 30 min. No leakage at 30 min at 75 psi. After another 15 min., pressure held.
****same test as Sample 17, with flame-outs noted underneath leakage pipe, but pressure never dipped low and was being vented by pressure relief valve. Fixture dropped to 0 psi after testing and cooled and post-test pressurization yielded leakage A comparative seal assembly ("Comparative Sample 1") was constructed in accordance with a prior art fire-seal design of Applicant, and had a configuration as shown by the longitudinal cross sectional view of FIG. 15. Comparative Sample 1 included a first seal 501 in the form of an L-ring composed of 954 EPDM, a first backup ring 502 composed of Arlon® 3000XT, and a pair of cammed backup rings 503, 504 that were each also composed of Arlon® 3000XT. A flame with a temperature of approximately 2000° F. was applied directly to the outside of the gland, and nitrogen was supplied at a pressure of 60 psi. Comparative Sample 1 failed after about 1 minute and the maximum internal temperature of the test apparatus at failure of the seal assembly was about 650° F. as measured by the thermocouple within the test apparatus.

Figure 16:
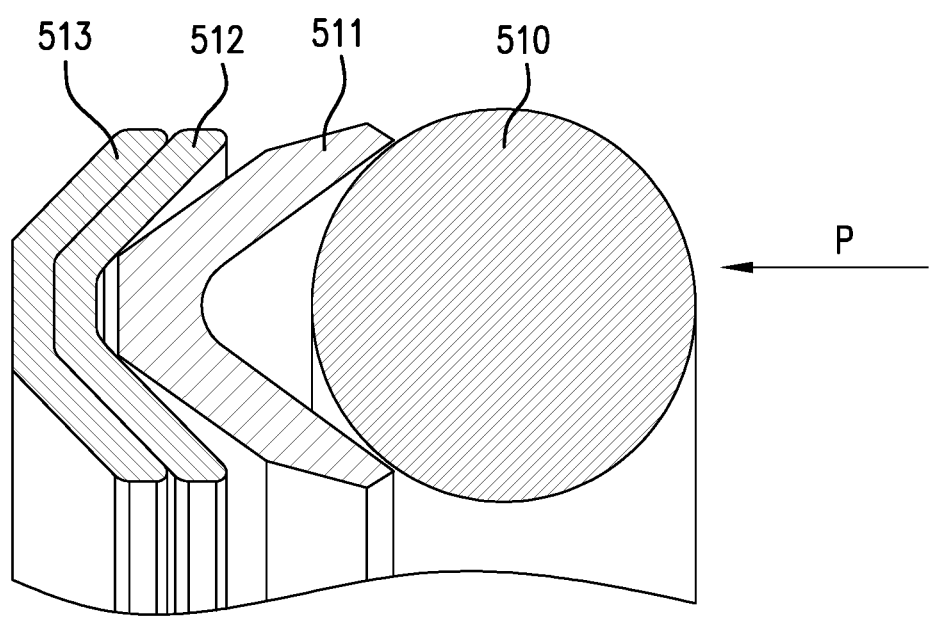
FIG. 16 is a longitudinal cross sectional view of a seal assembly as used in Comparative Sample 2 in Example 2.

Comparative Sample 2 was prepared from a first seal in the form of an O-ring 510 composed of 954 EPDM, a single scarf-cut Arlon® 1263 anti-extrusion seal 511, and a pair of Al—Ni—Br backer rings 512, 513, and had a configuration as shown by the longitudinal cross sectional view of FIG. 16. A flame with a temperature of approximately 2000° F. was applied directly to the outside of the gland, and nitrogen was supplied at a pressure of 73.5±7.5 psi. During testing, leakage was detected and a seal was reestablished prior to failure of the seal at 11 minutes and the maximum internal temperature of the test apparatus at failure of the seal assembly was about 1300° F. Comparative Sample 2 demonstrated improved performance relative to Comparative Sample 1, demonstrating an increased time until failure and a substantially higher maximum internal temperature at failure. However, leakage was detected during the testing period, wherein leakage is defined as detection of a leak of greater than 1 mL/min. The leakage is believed to be the result of the Arlon® 1263 anti-extrusion seal 511 not yet softening enough to form a seal after the first seal 510 failed. Once the Arlon® 1263 anti-extrusion seal 511 softened as the temperature increased, a seal was then reformed.

Figure 17:
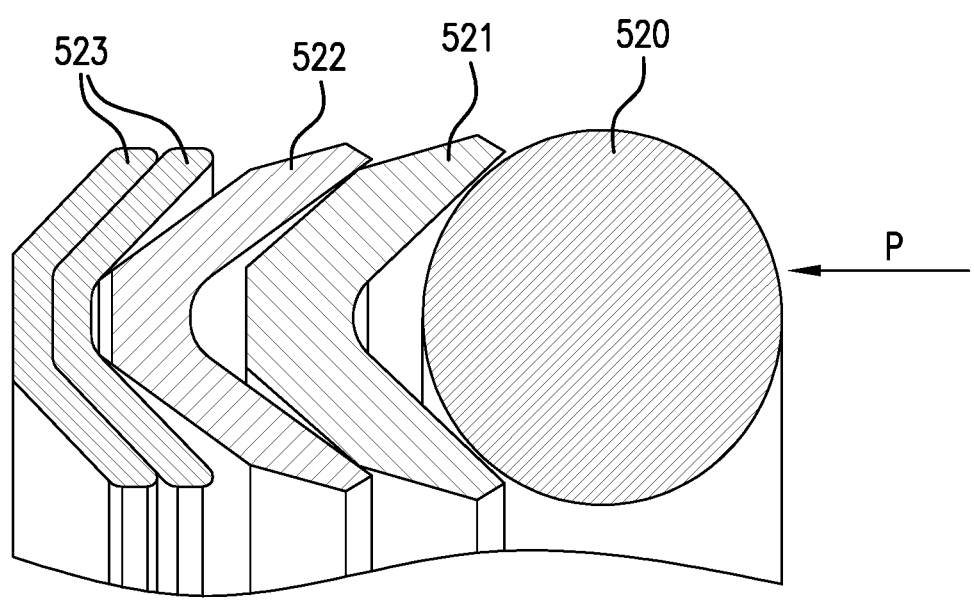
FIG. 17 is a longitudinal cross sectional view of an embodiment of the seal assembly as used in Inventive Sample 1 in Example 2.

Inventive Sample 1 was prepared from a first seal 520 in the form of an O-ring composed of 954 EPDM, a scarf cut Avalon® 89 anti-extrusion seal 521, a scarf cut Arlon® 1263 anti-extrusion seal 522, and a pair of Al—Ni—Br backer rings 523 each having a thickness of 0.015 inches, such that the inventive seal had a configuration as shown by the longitudinal cross sectional view of FIG. 17. Inventive Sample 1 included a second anti-extrusion seal relative to Comparative Sample 2 in order to attempt to address the early leakage demonstrated by Comparative Sample 2. A flame with a temperature of approximately 2000° F. was applied directly to the outside of the gland, and nitrogen was supplied at a pressure of 73.5±7.5 psi. Inventive Sample 1 failed at a maximum internal temperature of the test apparatus of about 1312° F. after 10 minutes and demonstrated no leakage during testing. Inventive Sample 1 demonstrated further improved performance relative to Comparative Sample 2 with no leakage detected during testing while maintaining a similar time until failure and demonstrated a slightly higher maximum internal temperature at failure.

Figure 18:
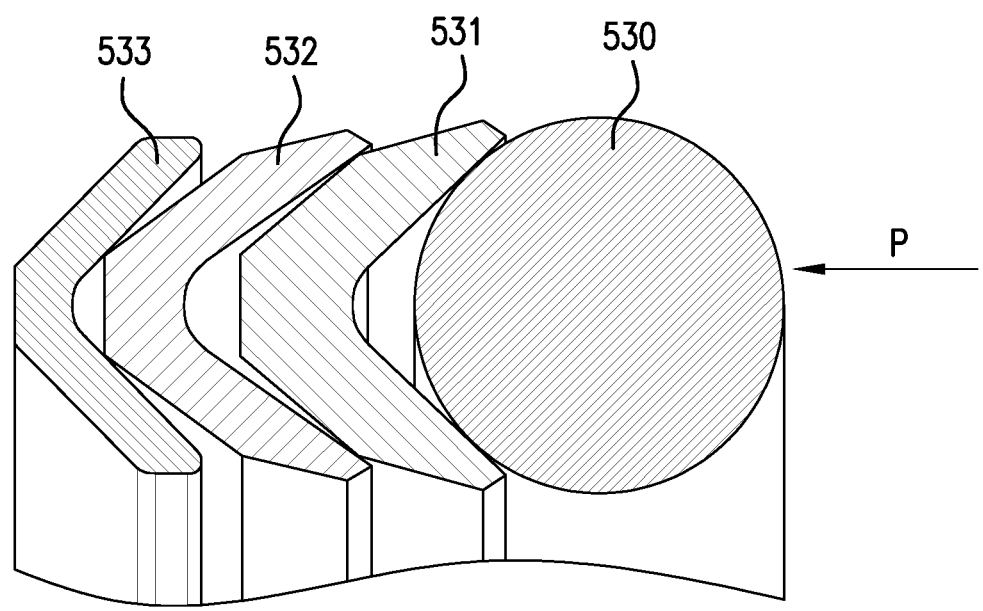
FIG. 18 is a longitudinal cross sectional view of an embodiment of the seal assembly as used in Inventive Sample 2 in Example 2.

Inventive Sample 2 was prepared from a first seal 530 in the form of an O-ring composed of 954 EPDM, a scarf cut Avalon® 89 anti-extrusion seal 531, a scarf-cut Arlon® 1263 anti-extrusion seal 532, and a single Al—Ni—Br backer ring 533 having a thickness of 0.015 inches, and having a configuration as shown by the longitudinal cross sectional view of FIG. 18. A flame with a temperature of approximately 2000° F. was applied directly to the outside of the gland, and nitrogen was supplied at a pressure of 73.5±7.5 psi. Inventive Sample 2 failed at a maximum internal temperature of the test apparatus of about 1075° F. after 6 minutes. Inventive Sample 2 demonstrated improved performance relative to Comparative Sample 1, which failed after only 1 minute and at a maximum internal temperature of 650° F., and relative to the Comparative Sample 2 which was found to leak during the test period. However, the use of a single Al—Ni—Br backer ring resulted in a lower maximum internal temperature at failure and a shorter time until failure relative to Inventive Sample 1, which utilized two Al—Ni—Br backer rings.

Figure 19:
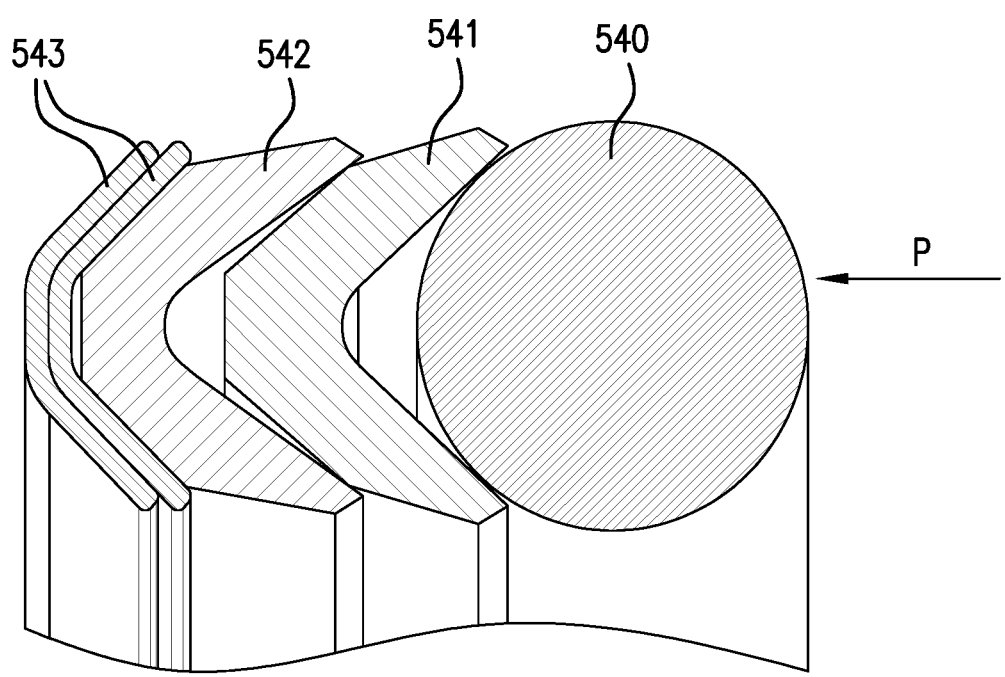
FIG. 19 is a longitudinal cross sectional view of an embodiment of the seal assembly as used in Inventive Sample 3 in Example 2.

Inventive Sample 3 was prepared from a first seal 540 in the form of an O-ring composed of 954 EPDM, a scarf cut Avalon® 89 anti-extrusion seal 541, a scarf-cut Arlon® 1263 anti-extrusion seal 542, and a pair of C260 brass backer rings 543, having a configuration as shown at FIG. 19. Inventive Sample 3 is similar to Inventive Sample 1 but included two brass backer rings rather than two Al—Ni—Br backer rings. A flame with a temperature of approximately 2000° F. was applied directly to the outside of the gland, and nitrogen was supplied at a pressure of 73.5±7.5 psi. Inventive Sample 3 failed at a maximum internal temperature of the test apparatus of about 1175° F. after 12 minutes. Inventive Sample 3 demonstrated improved performance relative to Comparative Sample 1, and had a longer time until failure and failed at a higher maximum internal temperature. Inventive Sample 3 having two C260 brass backer rings also demonstrated improved performance relative to Inventive Sample 2 which utilized only a single Al—Ni—Br backer ring.

Inventive Sample 4 was prepared in the same manner as Inventive Sample 1 and was prepared from a first seal in the form of an O-ring composed of 954 EPDM, a scarf cut Avalon® 89 anti-extrusion seal, a scarf-cut Arlon® 1263 anti-extrusion seal, and a pair of Al—Ni—Br backer rings each having a thickness of 0.015 inches. Inventive Sample 4 also had the configuration as shown at FIG. 17. A flame with a temperature of approximately 2000° F. was applied directly to the outside of the gland, and nitrogen was supplied at a pressure of 73.5±7.5 psi. Inventive Sample 4 failed after 14 minutes and at a maximum internal temperature at failure of the test apparatus of about 1366° F. The difference in performance of Inventive Sample 1 and Inventive Sample 4 is attributable to variability inherent in fire testing of seals, wherein seal performance can vary for many reasons including air currents which affect the flame as it is applied to the gland housing, and the pressure/conditions of the propane tank producing the flame, among others.

Figure 22:
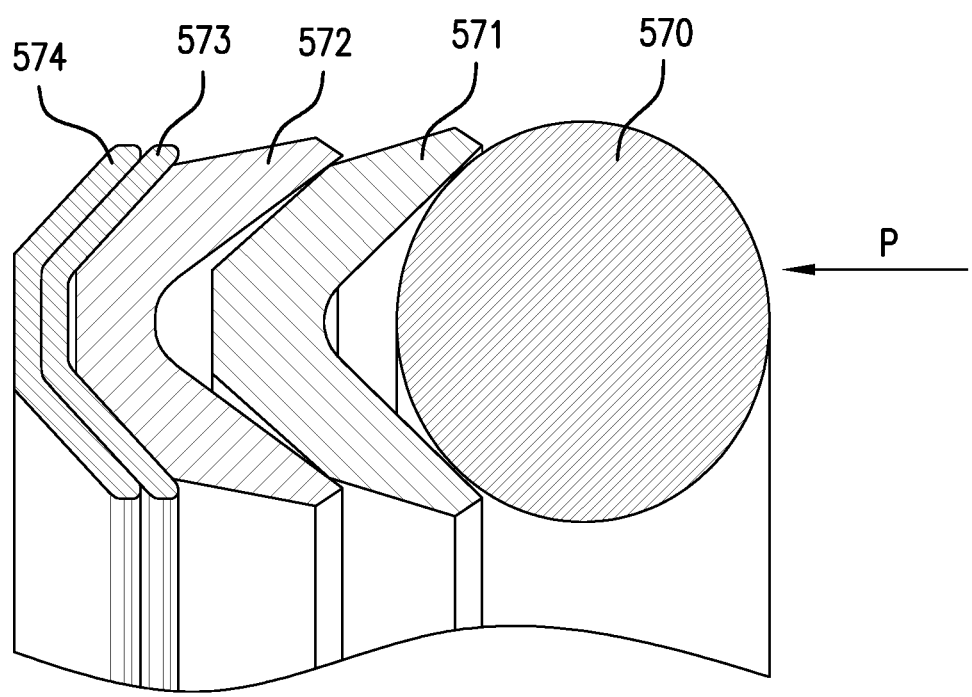
FIG. 22 is a longitudinal cross sectional view of an embodiment of the seal assembly as used in Inventive Samples 5 and 6 in Example 2.
Figure 23:
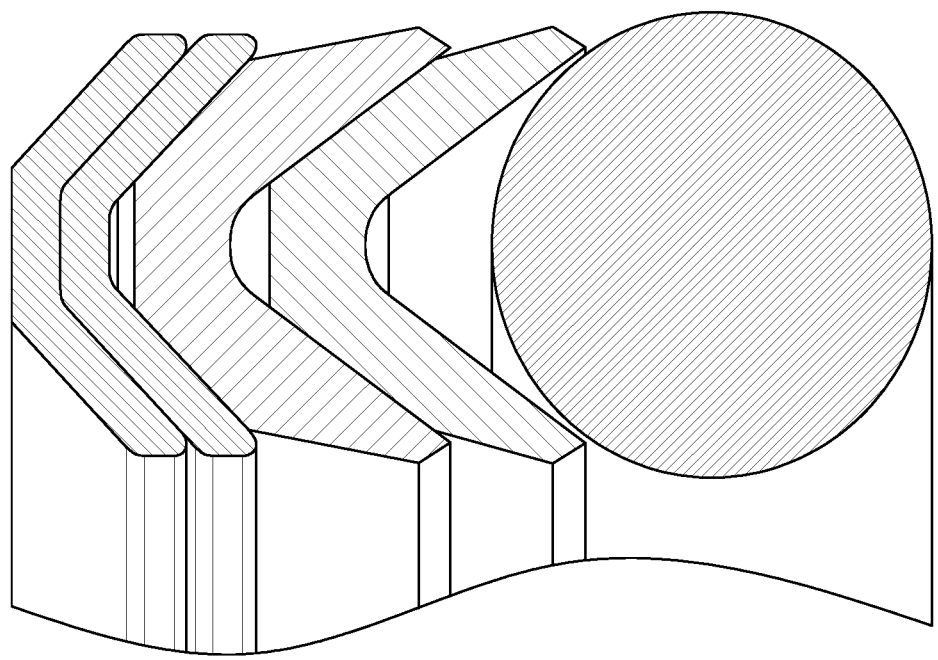
FIG. 23 is a longitudinal cross-sectional view of an assembly used in Sample 10 of Example 6 herein.
Figure 24:
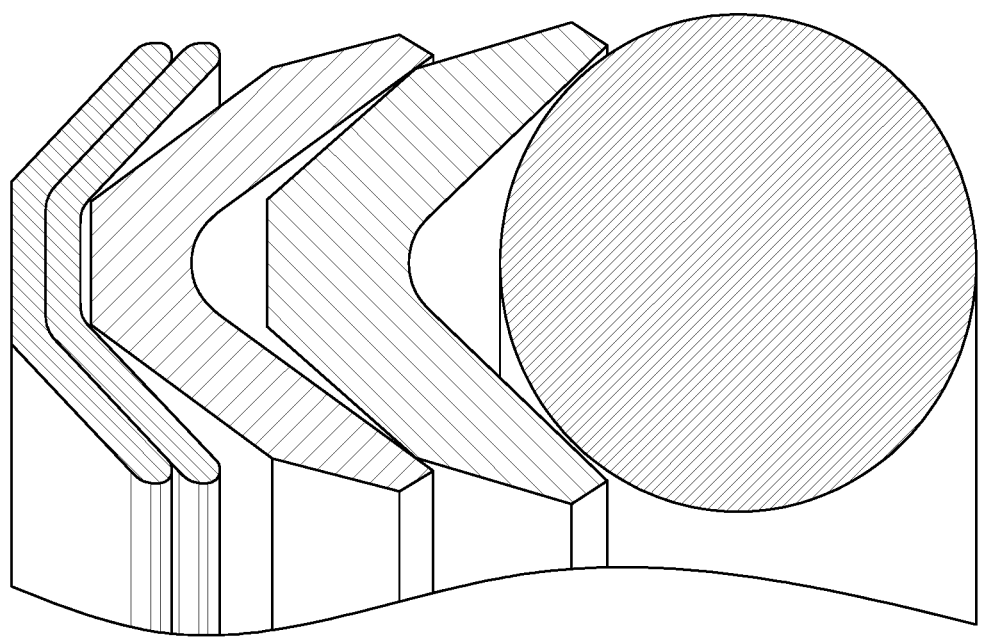
FIG. 24 is a longitudinal cross-sectional view of an assembly used in Sample 12 of Example 6 herein.
Figure 25:
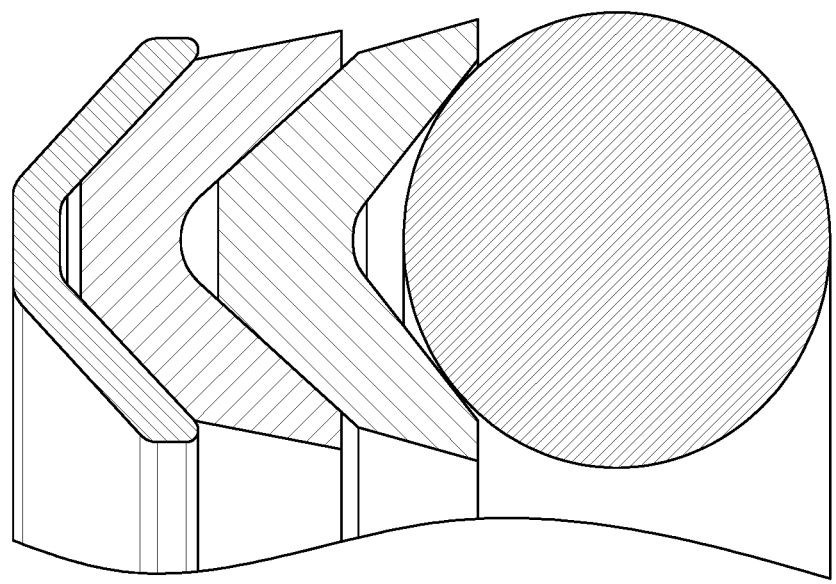
FIG. 25 is a longitudinal cross-sectional view of an assembly used in Sample 13 of Example 6 herein.
Figure 26:
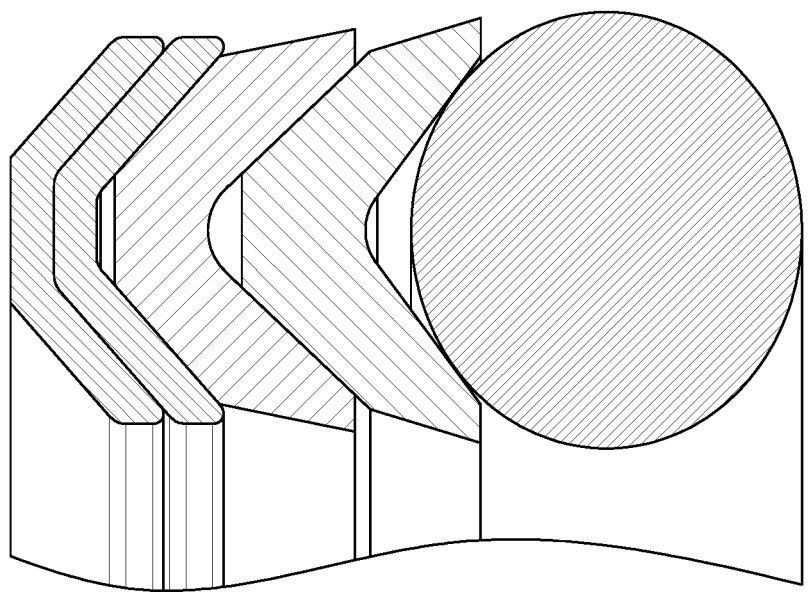
FIG. 26 is a longitudinal cross-sectional view of an assembly used in Samples 14-19 of Example 6 herein.

Inventive Samples 5 and 6 were identical and were each prepared from a first seal in the form of an O-ring 570 composed of 954 EPDM, a first anti-extrusion seal 571 of Avalon® 89, a second anti-extrusion seal 572 of Arlon® 1263, a pair of machined 0.010 inch thick Al—Ni—Br backer rings 573, 574, having the configuration as shown in the longitudinal cross sectional view of FIG. 22. Inventive Samples 5 and 6 were prepared in the same manner as Inventive Samples 1 and 4, but included backer rings having a reduced thickness. A flame with a temperature of approximately 2000° F. was applied directly to the outside of the gland, and nitrogen was supplied through the test apparatus at a pressure of 73.5±7.5 psi. Inventive Sample 5 failed at 11 minutes and at a maximum internal temperature of the test apparatus of about 1197° F. Inventive Sample 6 failed at 10 minutes and at a maximum internal temperature of the test apparatus of about 1180° F. The difference in the results for Inventive Samples 5 and 6 is attributable to the variability in testing fire seals as discussed. Inventive Samples 5 and 6 demonstrated good performance relative to the comparative seals, but failed at a lower maximum internal temperature of the test apparatus relative to Inventive Samples 1 and 4, believed to be the result of the reduced thickness of the backer rings.

EXAMPLE 3

Further testing was conducted to determine the performance of the fire-resistant seal assembly having a different diameter than the sample seal assemblies of Example 2. Inventive Sample 7 was prepared in the same manner as Inventive Samples 1 and 4 in Example 2, but had a reduced inner diameter of 0.674 inches. Thus, Inventive Sample 7 included a first seal in the form of an O-ring composed of 954 EPDM, a scarf cut Avalon® 89 anti-extrusion seal, a scarf-cut Arlon® 1263 anti-extrusion seal, and a pair of Al—Ni—Br backer rings, having a configuration as shown at FIG. 17. Inventive Sample 7 was tested with a flame temperature of approximately 2000° F. and a nitrogen pressure of 73.5±7.5 psi for a period of 5 minutes or until failure. Inventive Sample 7 failed at a maximum internal temperature of the test apparatus of about 1690° F., and no leakage was detected during the five minutes of testing. Thus, Inventive Sample 7 maintained a seal during the testing period and demonstrated a high maximum internal temperature at failure. The higher maximum internal temperature at failure relative to Inventive Samples 1 and 4 can be attributed to the smaller seal diameter, which allows for a higher maximum internal temperature at failure to be achieved relative to larger diameter seal assemblies.

EXAMPLE 4

Sample seal assemblies were prepared and tested according to an alternate embodiment of the fire-resistant seal assembly of the present invention as shown in FIGS. 10-11 in order to develop an improved fire-resistant seal assembly. Various sample seal assemblies were prepared and tested using the same apparatus as in Example 1. Once the sample seal assemblies were prepared, the sample seal assemblies were positioned in a gland L formed between concentric cylindrical components D of a test apparatus A, as shown in FIGS. 12-14. Nitrogen gas was supplied on a first side G of the apparatus A at a pressure of 60 psi to simulate the performance of the sample seal assemblies at operating pressure, and the opposing side J of the apparatus A was at atmospheric pressure. With a sample seal assembly installed in the gland L, the sample seal assembly was slowly heated by a flame produced by a propane torch having a starting temperature of about 1400° to a maximum temperature of about 1800° F., wherein the flame was applied directly to the front of the gland housing until the sample seal assembly failed. Once the sample seal failed, the maximum internal temperature of the test apparatus at failure of the seal assembly was determined by a thermocouple Q positioned within the test apparatus A.

EXAMPLE 5

Figure 20:
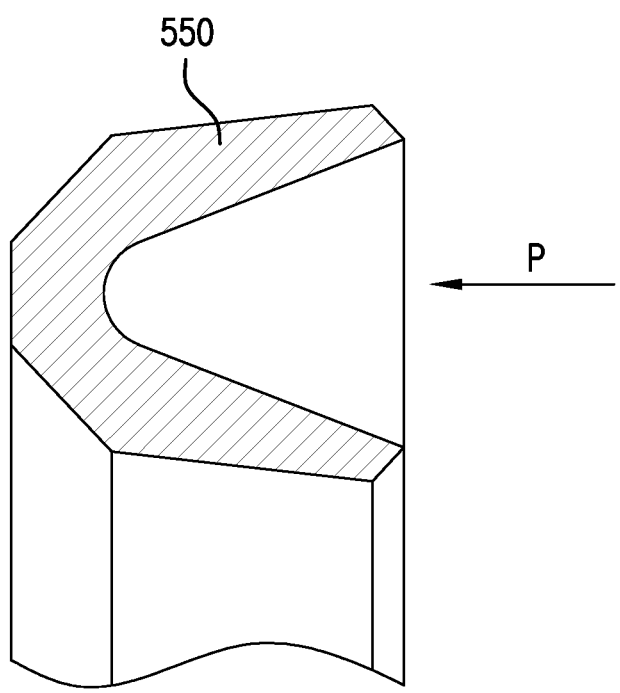
FIG. 20 is a longitudinal cross sectional view of a seal as used in Comparative Sample 3 in Example 5.
Figure 21:
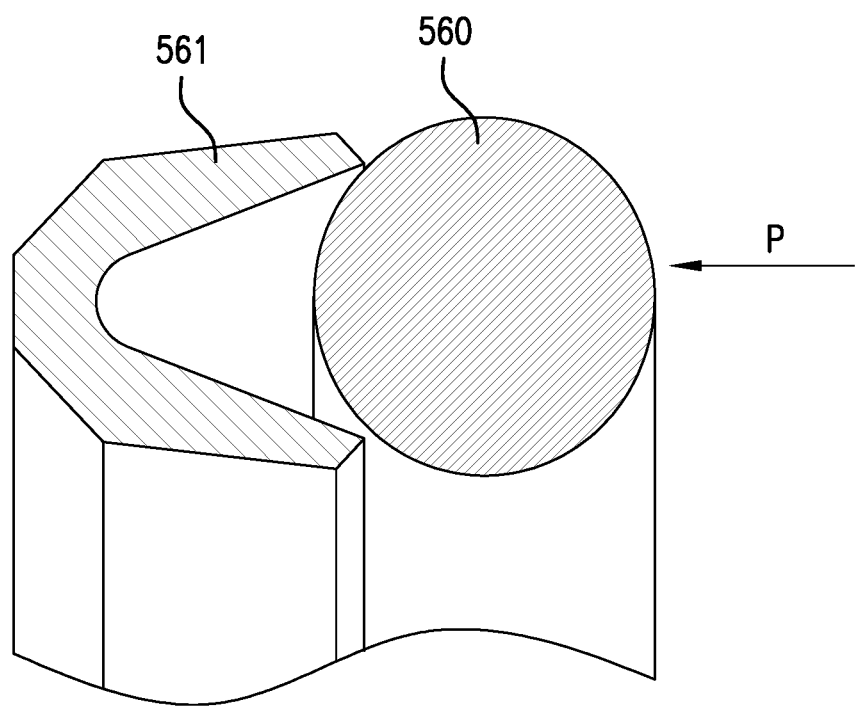
FIG. 21 is a longitudinal cross sectional view of a seal assembly as used in Inventive Sample 7 in Example 5.

Table 2 shows the compositions of the sample seal assemblies prepared for testing. The configurations of the seal assemblies are shown at FIGS. 20-21.

TABLE 2

| Sample Name | Comparative Sample 1 | Comparative Sample 3 | Comparative Sample 4 | Inventive Sample 8 |
| --- | --- | --- | --- | --- |
| First seal | 954 EPDM | — | 954 EPDM | 954 EPDM |
| First anti-extrusion seal | Arlon 3000XT | Solid Arlon 3000XT | Scarf-cut Arlon 3000XT | Solid Arlon 3000XT |
| Second anti-extrusion seal | Arlon 3000XT | — | — | — |
| Third anti-extrusion seal | Arlon 3000XT | — | — | — |
| Maximum internal temperature at failure (° F.) | 650 | 1015 | 1010 | 1020 |

Sample seal assemblies and temperature at failure when tested using a flame temperature increasing from 1400° F. to 1800° F.

Comparative Sample 3 included only a solid anti-extrusion seal 550, i.e., an anti-extrusion seal with no split or cut, composed of Arlon® 3000XT. Comparative Sample 3 had a configuration as shown in FIG. 20. Comparative Sample 3 failed at a maximum internal temperature of the test apparatus of about 1015° F. Comparative Sample 3 demonstrated improved performance relative to Comparative Sample 1, which was described above in Example 2 and failed at a temperature of 650° F.

Comparative Sample 4 was prepared from a first seal 560 in the form of an O-ring made of 954 EPDM and a scarf-cut anti-extrusion seal 561 of Arlon® 3000XT. Comparative Sample 4 had a configuration as shown by the longitudinal cross sectional view of FIG. 21. During testing, leakage was detected and a seal was reestablished prior to failure of the seal and the seal assembly failed at a maximum internal temperature of the test apparatus of about 1010° F. Comparative Sample 4 demonstrated improved high temperature performance relative to Comparative Sample 1 and failed at a higher maximum internal temperature of the test apparatus.

Inventive Sample 8 was prepared from a first seal in the form of an O-ring composed of 954 EPDM and a solid Arlon® 3000XT anti-extrusion seal. The Inventive Sample 8 also had a configuration as shown at FIG. 21, differing from Comparative Sample 4 only in that the anti-extrusion seal is solid, having no cut or split. Inventive Sample 8 failed at a maximum internal temperature of the test apparatus of about 1020° F. and demonstrated no leakage. Inventive Sample 8 demonstrated improved performance relative to Comparative Sample 1 as well as Comparative Samples 3 and 4.

EXAMPLE 6

Further Inventive Samples 9, 10 and 11 as well as 12-19 were carried out with the results noted in Table 1 above. The seal assemblies had the designs of FIG. 9 in Sample 9, FIG. 23 in Sample 10, FIG. 19 in Sample 11, FIG. 24 for Sample 12, FIG. 25 for Sample 13 and FIG. 26 for Samples 14-19.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:
1. A fire-resistant seal assembly, comprising:
a first seal comprising an elastomeric material;
a first anti-extrusion seal having a first seal-facing surface for receiving the first seal, wherein the first seal-facing surface defines a groove extending along the first seal-facing surface, and an exterior surface, that when viewed in a longitudinal cross section, has a truncated V-shaped portion and beveled end portions configured for sealing contact with a gland;
at least one second anti-extrusion seal having a second seal-facing surface for receiving the first anti-extrusion seal, wherein the second seal-facing surface defines a groove extending along the second seal-facing surface, and an exterior surface that, when viewed in a longitudinal cross section, has a truncated V-shaped portion and beveled end portions configured for sealing contact with the gland, wherein the exterior surface of the first anti-extrusion seal is positioned at least partially within the groove of the at least one second anti-extrusion seal such that a portion of the exterior surface of the first anti-extrusion seal contacts the second seal-facing surface of the at least one second anti-extrusion seal; and at least one backer ring having a third seal-facing surface for receiving the at least one second anti-extrusion seal, wherein the third seal-facing surface defines a groove extending along the third seal-facing surface, and an exterior surface that, when viewed in a longitudinal cross section, has a truncated V-shape, wherein the exterior surface of the at least one second anti-extrusion seal is positioned at least partially within the groove of the at least one backer ring such that a portion of the exterior surface of the at least one second anti-extrusion seal contacts the third seal-facing surface of the at least one backer ring, wherein the first anti-extrusion seal comprises a first polymeric material, and the second anti-extrusion seal comprises a second polymeric material;

wherein a decomposition temperature of the first polymeric material of the first anti-extrusion seal is higher than a decomposition temperature of the elastomeric material of first seal;

wherein a decomposition temperature of the second polymeric material of the at least one second anti-extrusion seal is higher than a decomposition temperature of the first polymeric material of the first anti-extrusion seal; and wherein a decomposition temperature is a temperature at which a seal decomposes, deteriorates, or irreversibly fails such that the seal is no longer able to form a seal with a gland.

2. The fire-resistant seal assembly according to claim 1, wherein the seal assembly is fireproof.

3. The fire-resistant seal assembly according to claim 1, wherein the first seal is annular and has a generally circular longitudinal cross section.

4. The fire-resistant seal assembly according to claim 1, wherein the elastomeric material is selected from: ethylene propylene rubbers, nitrile rubber, silicone, fluorosilicone, a fluoroelastomer, and a perfluoroelastomer.

5. The fire-resistant seal assembly according to claim 1, wherein the groove defined by the first seal-facing surface of the first anti-extrusion seal extends annularly around the first seal-facing surface.

6. The fire-resistant seal assembly according to claim 1, wherein the first seal-facing surface of the first anti-extrusion seal is generally V-shaped in a longitudinal cross sectional view.

7. The fire-resistant seal assembly according to claim 6, wherein the first seal-facing surface of the first anti-extrusion seal comprises a first leg and a second leg, wherein the first leg and the second leg intersect at an intersection point, and wherein the angle measured between the first leg and the second leg from the intersection point is about 60 degrees to about 120 degrees.

8. The fire-resistant seal assembly according to claim 7, wherein the angle measured between the first leg and the second leg of the first seal-facing surface is about 80 degrees to about 100 degrees.

9. The fire-resistant seal assembly according to claim 7, wherein the first leg and the second leg intersect at a radiused bend in the first seal-facing surface.

10. The fire-resistant seal assembly according to claim 1, wherein the first anti-extrusion seal comprises the first polymeric material which is selected from: polytetrafluoroethylene (PTFE), a polyaryletherketone (PAEK), a polyethersulfone (PES), a polyphenylene sulfide (PPS), a polyimide (PI), and copolymers, derivatives and combinations thereof.

11. The fire-resistant seal assembly according to claim 10, wherein the first polymeric material comprises a filler, a reinforcing material, or a combination of a filler and a reinforcing material.

12. The fire-resistant seal assembly according to claim 1, wherein the second polymeric material comprises: a polyaryletherketone (PAEK), polyetheretherketone (PEEK), a polyethersulfone (PES), a polyphenylene sulfide (PPS), a polyimide (PI), and copolymers, derivatives and combinations thereof.

13. The fire-resistant seal assembly according to claim 12, wherein the second polymeric material comprises a filler, a reinforcing material, or a combination of a filler and a reinforcing material.

14. The fire-resistant seal assembly of claim 1, wherein the at least one backer ring comprises a third material that is more rigid than either of the first polymeric material or the second polymeric material.

15. The fire-resistant seal assembly of claim 14, wherein the third material of the at least one backer ring comprises a metal or metal alloy.

16. The fire-resistant seal assembly of claim 15, wherein the third material comprises an aluminum-nickel-bronze alloy and/or brass.

17. The fire-resistant seal assembly of claim 1, wherein the at least one backer ring has a substantially uniform thickness, wherein the thickness is measured from the third seal-facing surface along an axis perpendicular to the third seal-facing surface through the at least one backer ring to the exterior surface of the at least one backer ring.

18. The fire-resistant seal assembly of claim 1, comprising at least two backer rings, wherein the at least two backer rings are stacked in facing engagement.

19. The fire-resistant seal assembly of claim 1, wherein the fire-resistant seal assembly has a bidirectional configuration.

20. The fire-resistant seal assembly of claim 1, wherein when the fire-resistant seal assembly is installed in a gland of a hydraulic component, and the hydraulic component is exposed to a flame having a temperature of about 2000° F., the fire-resistant seal assembly maintains a seal for at least about 6 minutes prior to failure of the fire-resistant seal assembly.

21. The fire-resistant seal assembly of claim 20, wherein when the fire-resistant seal assembly maintains a seal for at least 15 minutes prior to failure of the fire-resistant seal assembly.

22. The fire-resistant hydraulic component of claim 20, wherein the hydraulic component is a hydraulic actuator.

23. The fire-resistant seal assembly of claim 1, having three anti-anti extrusion seals, wherein the at least one second anti-extrusion seal has two anti-extrusion seals of the same configuration, wherein one of the two anti-extrusion seals is a third anti-extrusion seal situated between the first anti-extrusion seal and the other of the two second anti-extrusion seals, wherein the third anti-extrusion seal has the second seal facing surface for receiving the first anti-extrusion seal in the groove extending along the seal-facing surface and the other of the two second anti-extrusion seals also has an exterior surface having a truncated V-shaped portion and beveled end portions configured for sealing contact with a gland, wherein the exterior surface of the other of the two second anti-extrusion seals is positioned at least partially within the groove of the at least one backer ring, and wherein the exterior surface of the third anti-extrusion seal contacts a seal-facing surface of the other of the two second anti-extrusion rings.

24. A fire-resistant hydraulic component, comprising:
a hydraulic component having the fire-resistant seal assembly of claim 1, wherein the fire-resistant seal assembly is configured to prevent leakage of hydraulic fluid from the hydraulic component.

25. A method of improving the fire-resistance in a hydraulic component, comprising: installing the fire-resistant seal assembly of claim 1 in a gland of a hydraulic component.

26. The method of claim 25, wherein when the hydraulic component is heated, a maximum internal temperature of the hydraulic component at failure of the fire-resistant seal assembly is at least about 1075° F.

27. The method of claim 26, wherein when the hydraulic component is heated, a maximum internal temperature of the hydraulic component at failure of the fire-resistant seal assembly is at least about 1175° F.

* * * * *